(12) United States Patent
Nicoleau et al.

(10) Patent No.: US 9,045,377 B2
(45) Date of Patent: Jun. 2, 2015

(54) HARDENING ACCELERATOR COMPOSITION CONTAINING PHOSPHATED POLYCONDENSATES

(75) Inventors: Luc Nicoleau, Altenmarkt an der Alz (DE); Gerhard Albrecht, Prien am Chiemsee (DE); Klaus Lorenz, Zangberg (DE); Eva Jetzlsperger, Garching (DE); Daniel Fridrich, Neuötting (DE); Thomas Wohlhaupter, Eggstaett (DE); Reinhard Dorfner, Kirchweidach (DE); Hubert Leitner, Traunwalchen (DE); Mario Vierle, Wasserburg (DE); Dirk Schmitt, Leimen St. Ilgen (DE); Michael Braeu, Traunstein (DE); Christoph Hesse, Ebersberg (DE); Sabrina Montero Pancera, Viernheim (DE); Siegfried Zuern, Eurasburg (DE); Michael Kutschera, Neustadt (DE)

(73) Assignee: Construction Research & Technology GmbH, Trostberg (DE)

(*) Notice: Subject to any disclaimer, the term of this patent is extended or adjusted under 35 U.S.C. 154(b) by 412 days.

(21) Appl. No.: 13/392,988

(22) PCT Filed: Aug. 12, 2010

(86) PCT No.: PCT/EP2010/061762
§ 371 (c)(1),
(2), (4) Date: May 17, 2012

(87) PCT Pub. No.: WO2011/026720
PCT Pub. Date: Mar. 10, 2011

(65) Prior Publication Data
US 2012/0220696 A1  Aug. 30, 2012

(30) Foreign Application Priority Data
Sep. 2, 2009 (EP) ..................................... 09169294

(51) Int. Cl.
C04B 14/04 (2006.01)
C04B 24/32 (2006.01)
C08L 5/00 (2006.01)
C08L 85/02 (2006.01)
C04B 40/00 (2006.01)
C04B 103/14 (2006.01)

(52) U.S. Cl.
CPC ......... C04B 40/0039 (2013.01); *C04B 2103/14* (2013.01)

(58) Field of Classification Search
CPC .......... C04B 14/04; C04B 24/32; C08K 3/34; C08L 5/00; C08L 85/02
USPC ............. 524/791, 556, 543, 442, 3, 610, 508, 524/27; 106/456, 713, 600, 735; 427/138
See application file for complete search history.

(56) References Cited

U.S. PATENT DOCUMENTS

| 5,332,041 A | 7/1994 | Onan et al. |
| 5,355,954 A | 10/1994 | Onan et al. |
| 5,360,841 A | 11/1994 | Knop et al. |
| 5,413,634 A | 5/1995 | Shawl et al. |
| 5,609,680 A | 3/1997 | Kobayashi et al. |
| 5,709,743 A | 1/1998 | Leture et al. |
| 5,925,184 A | 7/1999 | Hirata et al. |
| 6,170,574 B1 | 1/2001 | Jones |
| 6,832,652 B1 | 12/2004 | Dillenbeck et al. |
| 7,041,167 B2 | 5/2006 | Jiang |
| 7,258,736 B2 | 8/2007 | Oriakhi et al. |
| 7,605,196 B2 | 10/2009 | Schinabeck et al. |
| 7,641,731 B2 | 1/2010 | Chanut et al. |
| 7,772,300 B2 | 8/2010 | Schinabeck et al. |
| 8,349,960 B2 | 1/2013 | Gaeberlein et al. |
| 8,436,072 B2 | 5/2013 | Herth et al. |
| 2002/0129743 A1 | 9/2002 | Frailey et al. |
| 2002/0166479 A1 | 11/2002 | Jiang |

(Continued)

FOREIGN PATENT DOCUMENTS

| CA | 2071051 | 12/1992 |
| CA | 2172004 | 9/1996 |

(Continued)

OTHER PUBLICATIONS

PCT/EP2009/061334; International Search Report; Jan. 25, 2010.
PCT/EP2009/061334; International Written Opinion; Jan. 25, 2010.
PCT/EP2010/061809; International Search Report; Dec. 21, 2010.
PCT/EP2010/061809; International Search Report; Nov. 24, 2010.
Cölfen, Helmut; "Analytical Ultracentrifugation of NanoParticles"; Polymer News; 2004; vol. 29; p. 101; Taylor & Francis; Abstract.
Saito, Fumio, et al.; "Mechanical Synthesis of Hydrated Calcium Silicates by Room Temperature Grinding"; Solid State Ionics; 1977; pp. 37-43; Elsevier.
"Silica"; Ullmann's Encyclopedia of Industrial Chemistry; 2002; Wiley-VCH Verlag GmbH & Co. KGaA; Abstract.

(Continued)

*Primary Examiner* — James J Seidleck
*Assistant Examiner* — Deve E Valdez
(74) *Attorney, Agent, or Firm* — Curatolo Sidoti Co., LPA; Joseph G. Curatolo; Salvatore A. Sidoti

(57) ABSTRACT

The invention concerns a process for the preparation of a hardening accelerator composition by reaction of a water-soluble calcium compound with a water-soluble silicate compound and by reaction of a calcium compound with a silicon dioxide containing component under alkaline conditions, in both cases the reaction being carried out in the presence of a polycondensate containing at least one structural unit consisting of an aromatic or heteroaromatic moiety bearing a polyether side chain and at least one structural unit consisting of an aromatic or heteroaromatic moiety bearing at least one phosphoric acid ester group and/or its salt. The invention concerns a composition of calcium silicate hydrate and the polycondensate, its use as hardening accelerator and for the reduction of the permeability of hardened compositions.

59 Claims, 3 Drawing Sheets

(56) References Cited

U.S. PATENT DOCUMENTS

| | | |
|---|---|---|
| 2004/0261664 A1 | 12/2004 | Oriakhi et al. |
| 2007/0032550 A1 | 2/2007 | Lewis et al. |
| 2007/0163470 A1 | 7/2007 | Chanut et al. |
| 2008/0108732 A1 | 5/2008 | Wieland et al. |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2010/0190888 A1 | 7/2010 | Gaeberlein et al. |
| 2011/0015301 A1 | 1/2011 | Herth et al. |
| 2011/0160393 A1 | 6/2011 | Sakamoto et al. |
| 2011/0269875 A1 | 11/2011 | Nicoleau et al. |

FOREIGN PATENT DOCUMENTS

| | | |
|---|---|---|
| DE | 35 27 981 A1 | 2/1987 |
| DE | 43 42 407 A1 | 6/1995 |
| DE | 4411797 A1 | 10/1995 |
| DE | 197 24 700 A1 | 12/1998 |
| DE | 102004050395 A1 | 4/2006 |
| DE | 10 2005 001 101 A1 | 7/2006 |
| DE | 20 2006 016 797 U1 | 12/2006 |
| DE | 10 2005 051 375 A1 | 5/2007 |
| DE | 10 2007 027 470 A1 | 12/2008 |
| EP | 0 403 974 A1 | 12/1990 |
| EP | 0 518 156 A2 | 12/1992 |
| EP | 0 605 257 A1 | 12/1993 |
| EP | 0 637 574 A1 | 2/1995 |
| EP | 1138697 A1 | 10/2001 |
| EP | 1 491 516 A2 | 12/2004 |
| EP | 1655272 | 5/2006 |
| EP | 2 325 231 A1 | 5/2011 |
| JP | 2000095554 A | 4/2000 |
| JP | 2001058863 A | 3/2001 |
| JP | 2008127247 | 6/2008 |
| WO | WO 02/070425 A1 | 9/2002 |
| WO | WO 2005/077857 A2 | 8/2005 |
| WO | WO 2008/090424 A1 | 9/2005 |
| WO | WO 2006/002936 A1 | 1/2006 |
| WO | WO 2006/138277 A2 | 12/2006 |
| WO | WO 2007/071361 A1 | 6/2007 |
| WO | WO 2010/026155 A1 | 3/2010 |
| WO | WO 2011/006837 A1 | 1/2011 |
| WO | WO2011/026720 A1 | 3/2011 |
| WO | WO 2011/026825 A2 | 3/2011 |

OTHER PUBLICATIONS

PCT/EP2011/05334—International Search Report, Jul. 29, 2011.
PCT/EP2011/053349—International Written Opinion, Jul. 29, 2011.
PCT/EP2011/053349—International Preliminary Report on Patentability, Sep. 25, 2012.
PCT/EP2011/070820—International Search Report, Apr. 2, 2012.
PCT/EP2011/070820—International Written Opinion, Apr. 2, 2012.
PCT/EP2011/070820—International Preliminary Report on Patentability, Jun. 4, 2013.
PCT/EP2009/061334; International Preliminary Report on Patentability, Mar. 8, 2011.
PCT/EP2010/061809; International Written Opinion; Nov. 24, 2010.
PCT/EP2010/061809; International Preliminary Report on Patentability; Mar. 6, 2012.
PCT/EP2010/061762; International Written Opinion; Dec. 21, 2010.
PCT/EP2010/061762; International Preliminary Report on Patentability, Mar. 6, 2012.
EP 08163468.5, priority document, Sep. 2, 2008.
PCT/EP2010/062671; International Search Report, Mar. 11, 2011.
Non-final Office Action for U.S. Appl. No. 13/451,024 mailed Sep. 16, 2013.
Final Office Action for U.S. Appl. No. 13/451,024 mailed Jan. 28, 2014.
Non-Final Office Action for U.S. Appl. No. 13/451,024 mailed Jul. 8, 2014.
Non Final Office Action for U.S. Appl. No. 13/035,281 mailed Jun. 5, 2013.
Final Office Action for U.S. Appl. No. 13/035,281 mailed Dec. 17, 2013.
Final Office Action for U.S. Appl. No. 13/035,281 mailed Apr. 15, 2014.
Non-Final Office Action for U.S. Appl. No. 13/035,281 mailed Sep. 25, 2014.

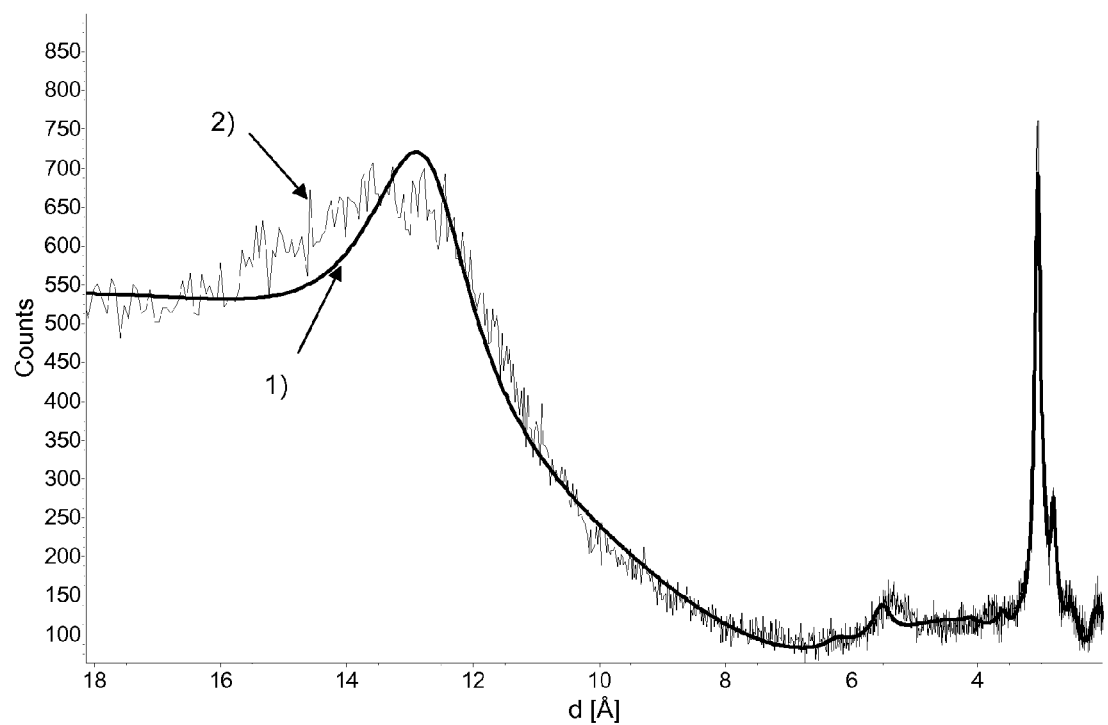
Figure 1: Comparison of diffraction patterns of tobermorite (calculated 1)) and a measured accelerator composition according to this invention (2))

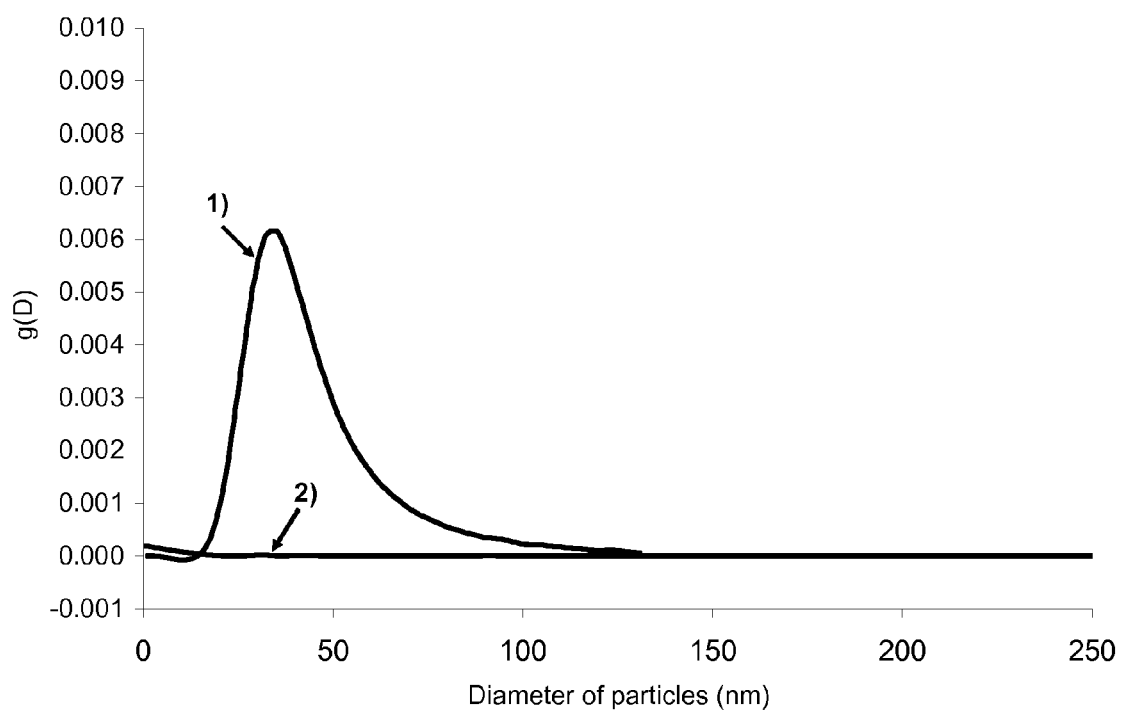
Figure 2: Particle size distribution of a calcium silicate hydrate, synthesized according to the present invention (1) and according to the state-of-art (2)

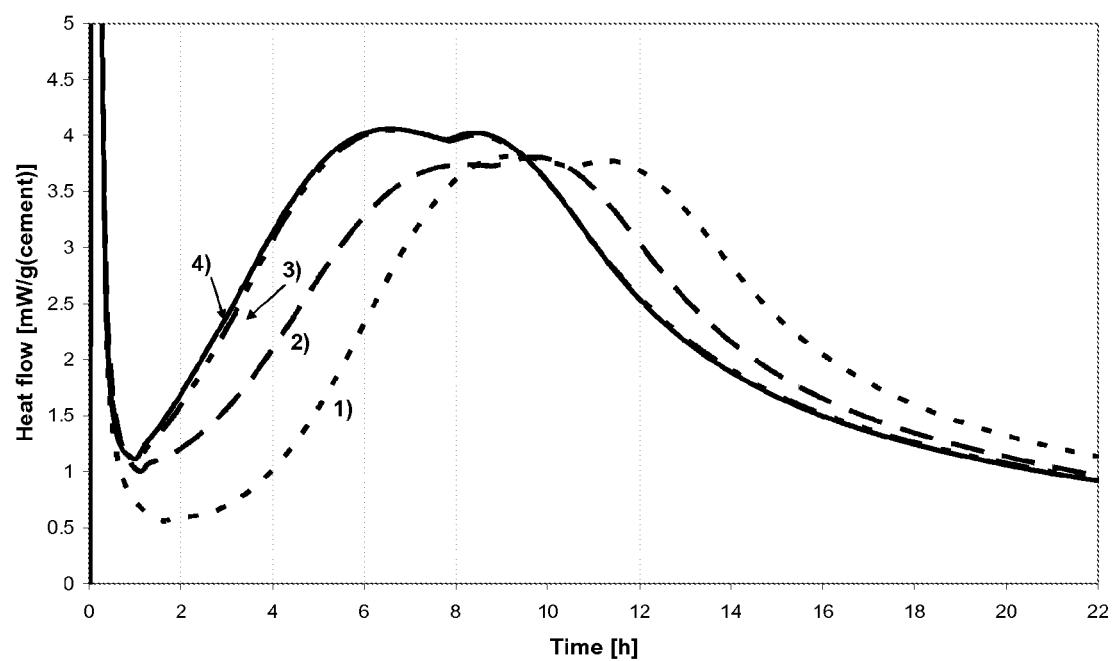
Figure 3: Heat flow curve of the hydration of Karlstadt cement

HARDENING ACCELERATOR COMPOSITION CONTAINING PHOSPHATED POLYCONDENSATES

This application is a national stage application of International Application No. PCT/EP2010/06176, files 12 Aug. 2010, which claims priority from European Patent Application Serial No. 09169294.7, filed 2 Sep. 2009, from which application priority is claimed, and which are incorporated herein by reference.

The present invention relates to a process for the preparation of a hardening accelerator composition, the hardening accelerator composition and the use of the hardening accelerator composition.

It is known that admixtures in the form of dispersants are often added to aqueous slurries of pulverulent inorganic or organic substances, such as clays, silicate powders, chalks, carbon blacks, powdered rocks and hydraulic binders, for improving their workability, i.e. kneadability, spreadability, sprayability, pumpability or flowability. Such admixtures are capable of breaking up solid agglomerates, dispersing the particles formed and in this way improving the fluidity. This effect is also utilised in a targeted manner in particular in the preparation of building material mixtures which contain hydraulic binders, such as cement, lime, gypsum, calcium sulphate hemihydrate (bassanite), anhydrous calcium sulphate (anhydrite), or latent hydraulic binders, such as fly ash, blast furnace slag or pozzolans.

In order to convert these building material mixtures based on said binders into a ready-to-use, workable form, as a rule substantially more mixing water is required than would be necessary for the subsequent hydration and hardening process. The proportion of cavities which are formed in the concrete body by the excess water which subsequently evaporates leads to significantly poorer mechanical strengths and durabilities.

In order to reduce this excess proportion of water at a predetermined processing consistency and/or to improve the workability at a predetermined water/binder ratio, admixtures which are generally referred to as water-reducer compositions or plasticizers are used. In particular, copolymers which are prepared by free radical copolymerization of acid monomers with polyether macromonomers are used in practice as such compositions.

Furthermore, admixtures for building material mixtures comprising hydraulic binders typically also contain hardening accelerators which shorten the setting time of the hydraulic binder. According to WO 02/070425, calcium silicate hydrate in particular present in dispersed (finely or particularly finely dispersed) form, can be used as such a hardening accelerator. However, commercially available calcium silicate hydrate or corresponding calcium silicate hydrate dispersions may be regarded only as hardening accelerators which have little effect.

Phosphated polycondensates are known in the prior art (US 20080108732 A1) to be effective as a superplasticiser in cementitious compositions. US 20080108732 A1 describes polycondensates based on an aromatic or heteroaromatic compound (A) having 5 to 10 C atoms or heteroatoms, having at least one oxyethylene or oxypropylene radical, and an aldehyde (C) selected from the group consisting of formaldehyde, glyoxylic acid and benzaldehyde or mixtures thereof, which result in an improved plasticizing effect of inorganic binder suspensions compared with the conventionally used polycondensates and maintain this effect over a longer period ("slump retention"). In a particular embodiment, these may also be phosphated polycondensates. However said polycondensates are not known in the litreature with respect to inorganic phases like for example calcium silicate hydrate.

The object of the present invention is therefore to provide a composition which acts in particular as a hardening accelerator and moreover performs as a plasticizer.

This object is achieved by a process for the preparation of a hardening accelerator composition by reaction of a water-soluble calcium compound with a water-soluble silicate compound, the reaction of the water-soluble calcium compound with the water-soluble silicate compound being carried out in the presence of an aqueous solution of a polycondensate, the polycondensate containing (I) at least one structural unit consisting of an aromatic or heteroaromatic moiety bearing a polyether side chain and (II) at least one structural unit consisting of an aromatic or heteroaromatic moiety bearing at least one phosphoric acid ester group and/or its salt.

In principle, only relatively slightly water-soluble compounds are also suitable in each case as water-soluble calcium compounds and water-soluble silicate compounds, although readily water-soluble compounds (which dissolve completely or virtually completely in water) are preferred in each case. However, it must be ensured there is a sufficient reactivity for the reaction in the aqueous environment with the corresponding reactant (either water-soluble calcium compound or water-soluble silicate compound). It is to be assumed that the reaction takes place in aqueous solution but a water-insoluble inorganic compound (calcium silicate hydrate) is usually present as a reaction product.

Typically the polycondensate contains (I) at least one structural unit consisting of an aromatic or heteroaromatic moiety bearing a polyether side chain, preferably a polyalkylene glycol side chain, more preferably a polyethylene glycol side chain. The structural unit consisting of an aromatic or heteroaromatic moiety bearing a polyether side chain, preferably a polyethylene glycol side chain is selected preferably from the group of alkoxylated, preferably ethoxylated, hydroxy-functionalized aromates or heteroaromates (for example the aromates can be selected from phenoxyethanol, phenoxypropanol, 2-alkoxyphenoxyethanols, 4-alkoxyphenoxyethanols, 2-alkylphenoxyethanols, 4-alkylphenoxyethanols) and/or alkoxylated, preferably ethoxylated, amino-functionalized aromates or heteroaromates (for example the aromates can be selected from N,N-(Dihydroxyethyl)aniline, N,-(Hydroxyethyl)aniline, N,N-(Dihydroxypropyl)aniline, N,-(Hydroxypropyl)aniline). More preferable are alkoxylated phenol derivatives (for example phenoxyethanol or phenoxypropanol), most preferable are alkoxylated, especially ethoxylated phenol derivatives featuring weight average molecular weights between 300 g/mol and 10,000 g/mol (for example polyethylenglycol monophenylethers). Typically the polycondensate contains (II) at least one phosphated structural unit consisting of an aromatic or heteroaromatic moiety bearing at least one phosphoric acid ester group and/or a salt of the phosphoric acid ester group, which is selected preferably from the group of alkoxylated hydroxy-functionalized aromates or heteroaromates (for example phenoxyethanol phosphate, polyethylenglycol monophenylether phosphates) and/or alkoxylated amino-functionalized aromates or heteroaromates (for example N,N-(Dihydroxyethyl)aniline diphosphate, N,N-(Dihydroxyethyl)aniline phosphate, N,-(Hydroxypropyl)aniline phosphate), which bear at least one phosphoric acid ester group and/or a salt of the phosphoric acid ester group (e.g. by esterification with phosphoric acid and optional addition of bases). More preferable are alkoxylated phenols bearing at least one phosphoric acid ester group and/or a salt of the phosphoric acid ester group (for example polyethylenglycol monophenylether phosphates with less than 25 ethylene glycol units) and most preferable are the respective alkoxylated phenols featuring weight average molecular weights between 200 g/mol and 600 g/mol (for example phenoxyethanol phosphate, polyethylenglycol monophenylether phosphates with 2 to 10 ethyleneglycol units), the alkoxylated phenols bearing at least one phosphoric acid ester group and/or a salt of the phosphoric acid ester group (e.g. by esterification with phosphoric acid and optional addition of bases).

In another embodiment of the invention the process is characterized in that in the polycondensate the structural units (I) and (II) are represented by the following general formulae

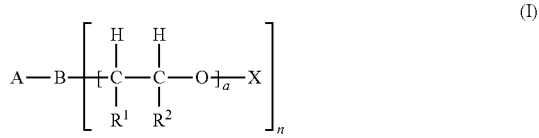

(I)

where

A are identical or different and are represented by a substituted or unsubstituted aromatic or heteroaromatic compound having 5 to 10 C atoms where B are identical or different and are represented by N, NH or O where n is 2 if B is N and n is 1 if B is NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where a are identical or different and are represented by an integer from 1 to 300 where

X are identical or different and are represented by a branched or straight-chain $C_1$- to $C_{10}$-alkyl radical, $C^5$- to $C_8$-cycloalkyl radical, aryl radical, heteroaryl radical or H, preferably H,

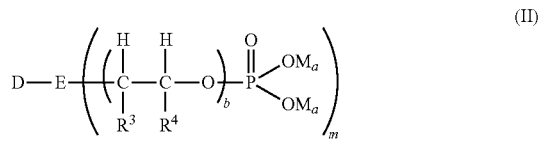

(II)

where

D are identical or different and are represented by a substituted or unsubstituted heteroaromatic compound having 5 to 10 C atoms where E are identical or different and are represented by N, NH or O where m is 2 if E is N and m is 1 if E is NH or O where $R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H where b are identical or different and are represented by an integer from 1 to 300 where

M is independently of one another an alkaline metal ion, alkaline earth metal ion, ammonium ion, organic ammonium ion and/or H, a is 1 or in the case of alkaline earth metal ions ½.

The groups A and D in the general formulae (I) and (II) of the polycondensate are preferably represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, it being possible for A and D to be chosen independently of one another and also in each case to consist of a mixture of said compounds. The groups B and E, independently of one another, are preferably represented by O. The radicals $R^1$, $R^2$, $R^3$ and $R^4$ can be chosen independently of one another and are preferably represented by H, methyl, ethyl or phenyl, particularly preferably by H or methyl and especially preferably by H.

In general formula (I) a is preferably represented by an integer from 1 to 300, in particular 3 to 200 and particularly preferably 5 to 150 and b in general formula (II) by an integer from 1 to 300, preferably 1 to 50 and particularly preferably 1 to 10. The respective radicals, the length of which is defined by a and b, respectively, may consist here of uniform building blocks, but a mixture of different building blocks may also be expedient. Furthermore, the radicals of the general formulae (I) or (II), independently of one another, may each have the same chain length, a and b each being represented by a number. As a rule, however, it will be expedient if mixtures having different chain lengths are present in each case so that the radicals of the structural units in the polycondensate have different numerical values for a and independently for b.

Frequently, the phosphated polycondensate according to the invention has a weight average molecular weight of 5.000 g/mol to 200.000 g/mol, preferably 10.000 to 100.000 g/mol and particularly preferably 15.000 to 55.000 g/mol.

The phosphated polycondensate can be present also in form of its salts, as for example the sodium, potassium, organic ammonium, ammonium and/or calcium salt, preferably as the sodium and/or calcium salt.

Typically the molar ratio of the structural units (I):(II) is 1:10 to 10:1, preferably 1:8 to 1:1. It is advantageous to have a relatively high proportion of structural units (II) in the polycondensate because a relatively high negative charge of the polymers has a good influence on the stability of the suspensions.

In a preferred embodiment of the invention the polycondensate contains a further structural unit (III) which is represented by the following formula

(III)

where

Y, independently of one another, are identical or different and are represented by (I), (II), or further constituents of the polycondensate where
R⁵ are identical or different and are represented by H, CH₃, COOH or a substituted or unsubstituted aromatic or heteroaromatic compound having 5 to 10 C atoms, preferably H
where
R⁶ are identical or different and are represented by H, CH₃, COOH or a substituted or unsubstituted aromatic or heteroaromatic compound having 5 to 10 C atoms, preferably H.

The polycondensates are typically prepared by a process in which (I) at least one structural unit consisting of an aromatic or heteroaromatic moiety bearing a polyether side chain (for example poly(ethyleneglycol)monophenyl ether) and (II) at least one structural unit consisting of an aromatic or heteroaromatic moiety bearing at least one phosphoric acid ester group and/or a salt of the phosphoric acid ester group (for example phenoxyethanol phosphoric acid ester) are reacted with (IIIa) a monomer having a keto group. Preferably the monomer having a keto group is represented by the general formula (IIIa),

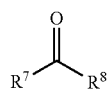

(IIIa)

where
R⁷ are identical or different and are represented by H, CH₃, COOH and/or a substituted or unsubstituted aromatic or heteroaromatic compound having 5 to 10 C atoms, preferably H,
where
R⁸ are identical or different and are represented by H, CH₃, COOH and/or a substituted or unsubstituted aromatic or heteroaromatic compound having 5 to 10 C atoms, preferably H. Preferably the monomer having a keto group is selected from the group of ketones, preferably being an aldehyde, most preferably formaldehyde. Examples for chemicals according to general structure (IIIa) are formaldehyde, acetaldehyde, acetone, glyoxylic acid and/or benzaldehyde. Formaldehyde is preferable.

Typically R⁵ and R⁶ in structural unit (III), independently of one another, are identical or different and are represented by H, COOH and/or methyl. Most preferable is H.

In another preferred embodiment of the invention the molar ratio of the structural units [(I)+(II)]:(III) is 1:0.8 to 3 in the polycondensate.

Preferably the polycondensation is carried out in the presence of an acidic catalyst, this catalyst preferably being sulphuric acid, methanesulphonic acid, para-toluenesulphonic acid or mixtures thereof. The polycondensation and the phosphation are advantageously carried out at a temperature between 20 and 150° C. and a pressure between 1 and 10 bar. In particular, a temperature range between 80 and 130° C. has proved to be expedient. The duration of the reaction may be between 0.1 and 24 hours, depending on temperature, the chemical nature of the monomers used and the desired degree of crosslinking. Crosslinking can preferably occur if monosubstituted monomers of structural unit I and/or II are used because the condensation reaction can occur in the two ortho positions and the para position. Once the desired degree of polycondensation has been reached, which can also be determined, for example, by measurement of the viscosity of the reaction mixture, the reaction mixture is cooled.

The reaction mixture might be subjected to a thermal after treatment at a pH between 8 and 13 and a temperature between 60 and 130° C. after the end of the condensation and phosphation reaction. As a result of the thermal after treatment, which advantageously lasts for between 5 minutes and 5 hours, it is possible substantially to reduce the aldehyde content, in particular the formaldehyde content, in the reaction solution. Alternatively the reaction mixture can be subjected to a vacuum treatment or other methods known in the prior art to reduce the content of (form)aldehyde.

In order to obtain a better shelf life and better product properties, it is advantageous to treat the reaction solutions with basic compounds. It is therefore to be regarded as being preferred to react the reaction mixture after the end of the reaction with a basic sodium, potassium, ammonium or calcium compound. Sodium hydroxide, potassium hydroxide, ammonium hydroxide or calcium hydroxide has proved to be particularly expedient here, it being regarded as being preferred to neutralize the reaction mixture. However, other alkali metal and alkaline earth metal salts and salts of organic amine are suitable as salts of the phosphated polycondensates as well.

Mixed salts of the phosphated polycondensates can also be prepared by reaction of the polycondensates with at least two basic compounds.

The catalyst used can also be separated off. This can conveniently be done via the salt formed during the neutralization. If sulphuric acid is used as a catalyst and the reaction solution is treated with calcium hydroxide, the calcium sulphate formed can be separated off, for example, in a simple manner by filtration.

Furthermore, by adjusting the pH of the reaction solution to 1.0 to 4.0, in particular 1.5 to 2.0, the phosphated polycondensate can be separated from the aqueous salt solution by phase separation and can be isolated. The phosphated polycondensate can then be taken up in the desired amount of water. However, other methods known to the person skilled in the art, such as dialysis, ultrafiltration or the use of an ion exchanger, are also suitable for separating off the catalyst.

Preferably the polycondensates according to this invention fulfil the requirements of the industrial standard EN 934-2 (February 2002).

In principle, the accelerator contains an inorganic and an organic component. The inorganic component may be regarded as modified, finely dispersed calcium silicate hydrate, which may contain foreign ions, such as magnesium and aluminium. The calcium silicate hydrate is prepared in the presence of the polycondensate according to this invention (organic component). Usually, a suspension containing the calcium silicate hydrate in finely dispersed form is obtained, which suspension effectively accelerates the hardening process of hydraulic binders and can act as a plasticizer.

The inorganic component can in most cases be described with regard to its composition by the following empirical formula:

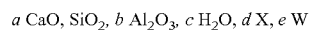

X is an alkali metal
W is an alkaline earth metal
0.1≤a≤2 preferably 0.66≤a≤1.8
0≤b≤1 preferably 0≤b≤0.1
1≤c≤6 preferably 1≤c≤6.0
0≤d≤1 preferably 0≤d≤0.4
0≤e≤2 preferably 0≤e≤0.1

In a preferred embodiment, the aqueous solution also contains, in addition to silicate and calcium ions, further dissolved ions which are preferably provided in the form of dissolved aluminium salts and/or dissolved magnesium salts. As aluminium salts preferably aluminium halogens, aluminium nitrate, aluminium hydroxide and/or aluminium sulphate can be used. More preferable within the group of aluminium halogens is aluminium chloride. Magnesium salts can be preferably magnesium nitrate, magnesium chloride and/or magnesium sulphate.

Advantage of the aluminium salts and magnesium salts is that defects in the calcium silicate hydrate can be created via the introduction of ions different to calcium and silicon. This leads to an improved hardening acceleration effect. Preferably the molar ratio of aluminium and/or magnesium to calcium and silicon is small. More preferably the molar ratios are selected in a way that in the previous empirical formula the preferable ranges for a, b and e are fulfilled ($0.66 \leq a \leq 1.8$; $0 \leq b \leq 0.1$; $0 \leq e \leq 0.1$).

In a preferred embodiment of the invention, in a first step, the water-soluble calcium compound is mixed with the aqueous solution which contains a polycondensate according to this invention, so that a mixture preferably present as a solution is obtained, to which the water-soluble silicate compound is added in a subsequent second step. The water-soluble silicate compound of the second step can also contain the polycondensate according to this invention.

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight %, more preferably less than 10 weight % and the most preferably less than 5 weight %. However most preferable are aqueous systems without any solvent. The temperature range in which the process is carried out is not especially limited. Certain limits however are imposed by the physical state of the system. It is preferable to work in the range of 0 to 100° C., more preferable 5 to 80° C. and most preferable 15 to 35° C. High temperatures can be reached especially when a milling process is applied. It is preferable not to exceed 80° C.

Also the process can be carried out at different pressures, preferably in a range of 1 to 5 bars.

The pH-value depends on the quantity of reactants (water-soluble calcium compound and water-soluble silicate) and on the solubility of the precipitated calcium silicate hydrate. It is preferable that the pH value is higher than 8 at the end of the synthesis, preferably in a range between 8 and 13.5.

In a further preferred embodiment (embodiment 1), the aqueous solution containing the polycondensate furthermore has the water-soluble calcium compound and the water-soluble silicate compound as components dissolved in it. This means that the reaction of the water-soluble calcium compound and the water-soluble silicate compound in order to precipitate calcium silicate hydrate occurs in the presence of an aqueous solution which contains the polycondensate according to this invention.

A further preferred embodiment (embodiment 2) is characterized in that a solution of a water-soluble calcium compound and a solution of a water-soluble silicate compound are added preferably separately to the aqueous solution containing the polycondensate. To illustrate how this aspect of the invention can be carried out, for example three solutions can be prepared separately (solution (I) of a water-soluble calcium compound, solution (II) of a water-soluble silicate compound and a solution (III) of the polycondensate according to this invention). Solutions (I) and (II) are preferably added separately and simultaneously added to solution (III). Advantage of this preparation method is besides its good practicability that relatively small particle sizes can be obtained.

In a further preferred embodiment of the invention the previous standing embodiment 2 can be modified in that the solution of a water soluble calcium compound and/or the solution of a water-soluble silicate compound contain a polycondensate. In this case the method is carried out in principle in the same way as described in the previous embodiment 2, but solution (I) and/or solution (II) preferably contain also the polycondensate according to this invention. In this case the person skilled in the art will understand that the polycondensate according to this invention is distributed to at least two or three solutions. It is advantageous that 1 to 50%, preferably 10 to 25% of the total of the polycondensate according to this invention are contained in the calcium compound solution (e.g. solution (I)) and/or silicate compound solution (e.g. solution (II)). This preparation method has the advantage that the polycondensate according to this invention is present also in the solution of the water-soluble calcium compound and/or the solution of the water-soluble silicate compound.

In a further preferred embodiment of the invention the previous embodiment 2 can be modified in that the aqueous solution containing a polycondensate according to this invention contains a water-soluble calcium compound or a water-soluble silicate compound.

In this case the method is carried out in principle in the same way as described in the previous embodiment 2, but solution (III) would contain a water-soluble calcium compound or a water-soluble silicate compound. In this case the person skilled in the art will understand that the water-soluble calcium compound or the water-soluble silicate compound is distributed to at least two solutions.

In a preferred embodiment the process is characterized in that the addition of the water-soluble calcium compound and of the water-soluble silicate compound to the aqueous solution containing a polycondensate is carried out in a cyclic semi-batch process with a first and a second reactor in series, the second reactor containing initially an aqueous solution of the polycondensate, the first reactor being fed with the solution of the water-soluble silicate compound, the solution of the water-soluble calcium compound and with the contents of the second reactor and the outflow of the first reactor being added to the second reactor or characterized in that said addition is carried out in a continuous process in which the water-soluble calcium compound, the water-soluble silicate compound and the aqueous solution which contains the polycondensate are mixed in the first reactor and the resulting outflow is fed into a mixed flow reactor or into a plug flow reactor.

Preferably the ratio of the volumes of the first and second reactor is from 1/10 to 1/20.000. Preferably the mass flow rate of the water-soluble calcium and water-soluble silicate compounds is small compared to the mass flow leaving the second and entering the first reactor, preferably the ratio is from 1/5 to 1/1000. Typically the first reactor can be a static or a dynamic mixing unit, preferably the mixing in the first reactor should be effective.

In general, the components are used in the following ratios:
i) 0.01 to 75, preferably 0.01 to 51, most preferably 0.01 to 15% by weight of water-soluble calcium compound,
ii) 0.01 to 75, preferably 0.01 to 55, most preferably 0.01 to 10% by weight of water-soluble silicate compound,
iii) 0.001 to 60, preferably 0.1 to 30, most preferably 0.1 to 10% by weight of the polycondensate,
iv) 24 to 99, preferably 50 to 99, most preferably 70 to 99% by weight of water.

Preferably the hardening accelerator composition is dosed at 0.01 to 10 weight %, most preferably at 0.1 to 2 weight % of the solids content with respect to the hydraulic binder, preferably cement. The solids content is determined in an oven at 60° C. until a constant weight of the sample is reached.

Often, the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate calcium aluminate, tricalcium silicate and/or dicalcium silicate. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate).

The water-soluble calcium compound is preferably present as calcium citrate, calcium tartrate, calcium formate and/or calcium sulphate. Advantage of these calcium compounds is their non-corrosiveness. Calcium citrate and/or calcium tartrate are preferably used in combination with other calcium sources because of the possible retarding effect of these anions when used in high concentrations.

In a further embodiment of the invention the calcium compound is present as calcium chloride and/or calcium nitrate. Advantage of these calcium compounds is their good solubility in water, low price and good availability.

Often, the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass. Advantage of these silicate compounds is their extremely good solubility in water.

Preferably species of different types are used as the water-soluble silicate compound and as the water-soluble calcium compound.

In a preferable process water-soluble alkali metal ions (for example lithium, sodium, potassium . . . ) are removed from the hardening accelerator composition by cation exchangers and/or water-soluble nitrate and/or chloride ions are removed from the hardening accelerator composition by anion exchangers. Preferably the removal of said cations and/or anions is carried out in a second process step after the preparation of the hardening accelerator composition by the use of the ion exchangers. Acid ion exchangers suitable as cation exchanger are for example based on sodium polystyrene sulfonate or poly-2-acrylamido-2-methylpropane sulfonic acid (poly AMPS). Basic ion exchangers are for example based on amino groups, like for example poly(acrylamido-N-propyltrimethylammonium chloride) (poly APTAC).

The invention concerns also a process for the preparation of a hardening accelerator composition by reaction of a calcium compound, preferably a calcium salt, most preferably a water-soluble calcium salt with a silicon dioxide containing component under alkaline conditions characterized in that the reaction is carried out in the presence of an aqueous solution of a polycondensate, the polycondensate containing
(I) at least one structural unit consisting of an aromatic or heteroaromatic moiety bearing a polyether side chain and
(II) at least one structural unit consisting of an aromatic or heteroaromatic moiety bearing at least one phosphoric acid ester group and/or its salt.

Typically the calcium compounds are calcium salts (e.g. calcium salts of carboxylic acids). The calcium salt can be for example calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate, calcium aluminate, tricalcium silicate and/or dicalcium silicate. Preferable are calcium hydroxide and/or calcium oxide because of their strong alkaline properties. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate). Less preferable are also not so good soluble calcium salts like for example calcium carbonate and also calcium salts with retarding anions (e.g. citrate, gluconate, tartrate can retard the hardening of hydraulic binders). In the case of neutral or acid calcium salts (e.g. calcium chloride or calcium nitrate) it is preferable to use a suitable base to adjust the pH-value to alkaline conditions (e.g. lithium hydroxide, sodium hydroxide, potassium hydroxide, ammonia, magnesium hydroxide or any other earth alkali hydroxide). Preferable is a pH-value higher than 8, more preferable higher than 9 and most preferable higher than 11. The pH-value is measured preferably at 25° C. and with a solid content of the suspension of 1 weight %.

It is possible to use any material which contains silicon dioxide, for example microsilica, pyrogenic silica, precipitated silica, blast furnace slag and/or quartz sand. Small particle sizes of the silicon dioxide containing material are preferable, especially particle sizes below 1 μm. Further it is possible to use compounds which are able to react in an aqueous alkaline environment to silicon dioxide like for example tetraalkoxy silicon compounds of the general formula $Si(OR)_4$. R can be the same or different and can be for example selected from a branched or non-branched C1 to C10 alkyl group. Preferably R is methyl, especially preferably ethyl.

In a preferred embodiment the silicon dioxide containing compound is selected from the group of microsilica, pyrogenic silica, precipitated silica, blast furnace slag and/or quartz sand. Preferable are microsilica, pyrogenic silica and/or precipitated silica, especially precipitated and/or pyrogenic silica. The types of silica, which are listed above are defined in Ullmann's Encyclopedia of Industrial Chemistry, Wiley-VCH, Release 2009, $7^{th}$ Edition, DOI 10.1002/14356007.a23_583.pub3.

It is preferable to apply mechanical energy, preferably by milling, to the reaction mixture in order to activate and/or accelerate the reaction of the calcium salt with the usually low water-soluble silicon dioxide containing component. The mechanical energy is also advantageous in order to reach the desired small particle sizes of the calcium silicate hydrates. The wording "milling" means in this patent application any process in which high shear forces are exerted on the reaction mixture in order to accelerate the reaction and to obtain a suitable particle size. For example milling can be carried out in a planet ball mill in a continuous or batch operation mode.

Alternatively an ultradisperser, preferably with a number of revolutions higher than 5.000 r.p.m. can be used. Also it is possible to apply a so-called shaker equipment in which small grinding bodies, preferably smaller than 1 mm in diameter are put together with the reaction mixture into a receptacle and are shaken. The respective shaker equipment is for example available from the company Skandex.

Typically the pH-value of the process for the preparation of a hardening accelerator is higher than 9.

Preferably the molar ratio of calcium from the calcium compound to silicon from the silicon dioxide containing component is from 0.6 to 2, preferably 1.1 to 1.8.

Typically the weight ratio of water to the sum of calcium compound and silicon dioxide containing component is from 0.2 to 50, preferably 2 to 10, most preferably 4 to 6. In this context water means the water in the reaction mixture, in which the process is carried out. It is preferable to carry out the process at relatively low water contents in order to increase the output of the process. Also it is possible to obtain relatively conveniently dry products from the wet products because not so much water has to be removed. A ratio of 2 to 10, respectively 4 to 6 is especially preferred because a paste like consistency of the products can be obtained, which is preferable for the milling process.

It is preferred that the process according to this invention is carried out at a site of concrete production (for example a ready-mix concrete, precast concrete plant or any other plant where mortar, concrete or any other cementitious products are produced), characterized in that the obtained hardening accelerator composition is used as the batching water. The obtained hardening accelerator composition is an aqueous system and can be used directly as the batching water, especially when designing the hardening accelerators according to the specific needs of a job-site.

Batching water in this context is the water, which is used in concrete production or production of similar cementitious materials. Typically the batching water is mixed with cement and for examples aggregates at a ready mix concrete plant or precast concrete plant, at a construction site or any other place where concrete or other cementitious materials are produced. Usually the batching water can contain a wide range of additives like for example plasticizers, hardening accelerators, retarders, shrinkage reducing additives, air entrainers and/or defoamers. It is advantageous to produce the hardening accelerators according to this invention in the batching water intended for production of concrete or similar materials, because there is no need to transport the respective admixtures.

A further preferred embodiment of the invention, preferably carried out at a site of concrete production (for example a ready mix concrete or precast concrete plant) is characterized in that the weight ratio of the sum of water-soluble calcium compound, water-soluble silicate compound and polycondensate according to this invention to water, preferably batching water, is between 1/1000 and 1/10, more preferably between 1/500 and 1/100. A high dilution of the suspensions is advantageous for the efficiency of the hardening accelerators.

In a preferred embodiment of the invention the process is characterized in that water-soluble comb polymers suitable as a plasticizer for hydraulic binders, preferably a comb polymer obtainable by radical polymerization of unsaturated monomers, are present in the aqueous solution, which contains a polycondensate, the polycondensate containing
(I) at least one structural unit consisting of an aromatic or heteroaromatic moiety bearing a polyether side chain and
(II) at least one structural unit consisting of an aromatic or heteroaromatic moiety bearing at least one phosphoric acid ester group and/or its salt.

Preferably the aqueous solution in which the reaction is carried out contains besides the polycondensate a second polymer. The second polymer is a water-soluble comb polymer suitable as a plasticizer for hydraulic binders, preferably a comb polymer obtainable by radical polymerization of unsaturated monomers.

In the context of the present invention, comb polymers are to be understood as polymers which have relatively long side chains (having a molecular weight of in each case at least 200 g/mol, particularly preferable at least 400 g/mol) on a linear main chain at more or less regular intervals. The lengths of these side chains are frequently approximately equal but may also differ greatly from each other (for example when polyether macromonomers having side chains of different length are incorporated in the form of polymerized units). Such polymers can be obtained for example by a radical polymerization of acid monomers and polyether macromonomers. Esterification and/or amidation of poly(meth)acrylic acid with suitable monohydroxy functional, respectively monoamino functional poly alkylene glycols, preferably alkyl polyethylene glycols is an alternative route to such comb polymers. Comb polymers obtainable by esterification and/or amidation of poly(meth)acrylic acid are for example described in EP1138697B1, the disclosure of which is incorporated by reference.

Preferably the average molecular weight $M_w$ as determined by gel permeation chromatography (GPC) of the water-soluble comb-polymer suitable as a plasticizer for hydraulic binders is from 5.000 to 200.000 g/mol, more preferably from 10.000 to 80.000 g/mol, most preferably from 20.000 to 70.000 g/mol. The polymers were analysed by means of size exclusion chromatography with respect to average molar mass and conversion (column combination: OH-Pak SB-G, OH-Pak SB 804 HQ and OH-Pak SB 802.5 HQ from Shodex, Japan; Eluent: 80% by volume of aqueous solution of $HCO_2NH_4$ (0.05 mol/l) and 20% by volume of acetonitrile; injection volume 100 μl; flowrate 0.5 ml/min). The calibration for determining the average molar mass was effected using linear poly(ethylene oxide) and polyethylene glycol standards. As a measure of the conversion, the peak of the copolymer is standardized to a relative height of 1 and the height of the peak of the unconverted macromonomer/PEG-containing oligomer is used as a measure of the content of residual monomer.

In a preferred embodiment, the water-soluble comb polymer suitable as a plasticizer for hydraulic binders is present as a copolymer which contains, on the main chain, side chains having ether functions and acid functions.

In a preferred embodiment, the water-soluble comb polymer suitable as a plasticizer for hydraulic binders is present as a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer, and polyether macromonomer in the form of polymerized units. Acid monomer is to be understood as meaning monomers which are capable of free radical copolymerization, have at least one carbon double bond, contain at least one acid function, preferably a carboxylic acid function, and react as an acid in an aqueous medium. Furthermore, acid monomer is also to be understood as meaning monomers which are capable of free radical copolymerization, have at least one carbon double bond, form at least one acid function, preferably a carboxylic acid function, in an aqueous medium as a result of a hydrolysis reaction and react as an acid in an aqueous medium (example: maleic anhydride or hydrolysable esters of (meth)acrylic acid). In the context of the present invention, polyether macromonomers are compounds which are capable of free radical copolymerization, have at least one carbon double bond, and have at least two ether oxygen atoms, with the proviso that the polyether macromonomer structural units present in the copolymer have side chains which contain at least two ether oxygen atoms, preferably at least 4 ether oxygen atoms, more preferably at least 8 ether oxygen atoms, most preferably at least 15 ether oxygen atoms.

Structural units, which do not constitute an acid monomer or a polyether macromonomer can be for example styrene and derivatives of styrene (for example methyl substituted derivatives), vinyl acetate, vinyl pyrrolidon, butadiene, vinyl proprionate, unsaturated hydrocarbons like for example ethylene, propylene and/or (iso)butylene. This listing is a non-exhaustive enumeration. Preferable are monomers with not more than one carbon double bond.

In a preferred embodiment of the invention the water-soluble comb-polymer suitable as plasticizer for hydraulic binders is a copolymer of styrene and a half ester of maleic acid with a monofunctional polyalkylene glycol. Preferably such a copolymer can be produced by free radical polymerization of the monomers styrene and maleic anhydride (or maleic acid) in a first step. In the second step polyalkylene glycols, preferably alkyl polyalkylene glycols (preferably alkyl polyethylene glycols, most preferably methyl polyethyleneglycol) are reacted with the copolymer of styrene and maleic anhydride in order to achieve an esterification of the acid groups. Styrene can be completely or partially replaced by styrene derivatives, for example methyl substituted derivatives. Copolymers of this preferred embodiment are described in U.S. Pat. No. 5,158,996, the disclosure of which is incorporated into the present patent application.

Frequently, a structural unit is produced in the copolymer by incorporation of the acid monomer in the form polymerized units, which structural unit is in accordance with the general formulae (Ia), (Ib), (Ic) and/or (Id)

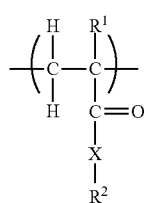
(Ia)

where $R^1$ are identical or different and are represented by H and/or a non-branched chain or a branched $C_1$-$C_4$ alkyl group;

X are identical or different and are represented by NH—$(C_nH_{2n})$ where n=1, 2, 3 or 4 and/or O—$(C_nH_{2n})$ where n=1, 2, 3 or 4 and/or by a unit not present;

$R^2$ are identical or different and are represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

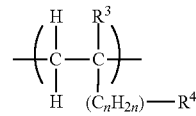
(Ib)

where $R^3$ are identical or different and are represented by H and/or a non-branched chain or a branched $C_1$-$C_4$ alkyl group;

n=0, 1, 2, 3 or 4

$R^4$ are identical or different and are represented by $SO_3H$, $PO_3H_2$, O—$PO_3H_2$ and/or para-substituted $C_6H_4$—$SO_3H$;

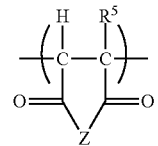
(Ic)

where $R^5$ are identical or different and are represented by H and/or a non-branched chain or a branched $C_1$-$C_4$ alkyl group;

Z are identical or different and are represented by O and/or NH;

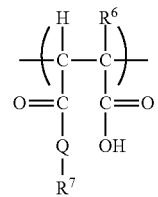
(Id)

where $R^6$ are identical or different and are represented by H and/or a non-branched chain or a branched $C_1$-$C_4$ alkyl group;

Q are identical or different and are represented by NH and/or O;

$R^7$ are identical or different and are represented by H, $(C_nH_{2n})$—$SO_3H$ where n=0, 1, 2, 3 or 4, preferably 1, 2, 3 or 4, $(C_nH_2)$—OH where n=0, 1, 2, 3 or 4, preferably 1, 2, 3 or 4; $(C_nH_2)$—$PO_3H_2$ where n=0, 1, 2, 3 or 4, preferably 1, 2, 3 or 4, $(C_nH_2)$—$OPO_3H_2$ where n=0, 1, 2, 3 or 4, preferably 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-(A'O)$_\alpha$—$R^9$ where m=0, 1, 2, 3 or 4, preferably 1, 2, 3 or 4, e=0, 1, 2, 3 or 4, preferably 1, 2, 3 or 4, A'=$C_{x'}H_{2x'}$ where x'=2, 3, 4 or 5 and/or $CH_2C(C_6H_5)$H—, α=an integer from 1 to 350 where $R^9$ are identical or different and are represented by a non-branched chain or a branched $C_1$-$C_4$ alkyl group.

Typically, a structural unit is produced in the copolymer by incorporation of the polyether macromonomer in the form of polymerized units, which structural unit is in accordance with the general formulae (IIa), (IIb) and/or (IIc)

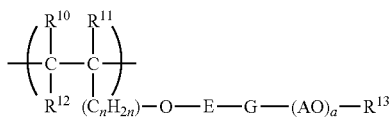

(IIa)

where
$R^{10}$, $R^{11}$ and $R^{12}$ are in each case identical or different and, independently of one another, are represented by H and/or a non-branched chain or a branched $C_1$-$C_4$ alkyl group;

E are identical or different and are represented by a non-branched chain or branched $C_1$-$C_6$ alkylene group, preferably $C_2$-$C_6$ alkylene group, a cyclohexylen group, $CH_2$—$C_6H_{10}$, ortho-, meta- or para-substituted $C_6H_4$ and/or a unit not present;

G are identical or different and are represented by O, NH and/or CO—NH, with the proviso that, if E is a unit not present, G is also present as a unit not present;

A are identical or different and are represented by $C_xH_{2x}$ where x=2, 3, 4 and/or 5 (preferably x=2) and/or $CH_2CH(C_6H_5)$;

n are identical or different and are represented by 0, 1, 2, 3, 4 and/or 5;

a are identical or different and are represented by an integer from 2 to 350 (preferably 10-200);

$R^{13}$ are identical or different and are represented by H, a non-branched chain or a branched $C_1$-$C_4$ alkyl group, CO—$NH_2$, and/or $COCH_3$;

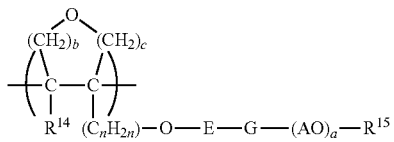

(IIb)

where
$R^{14}$ are identical or different and are represented by H and/or a non-branched chain or branched $C_1$-$C_4$ alkyl group;

E are identical or different and are represented by a non-branched chain or branched $C_1$-$C_6$ alkylene group, preferably a $C_2$-$C_6$ alkylene group, a cyclohexylen group, $CH_2$—$C_6H_{10}$, ortho-, meta- or para-substituted $C_6H_4$ and/or by a unit not present;

G are identical or different and are represented by a unit not present, O, NH and/or CO—NH, with the proviso that, if E is a unit not present, G is also present as a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5 a are identical or different and are represented by an integer from 2 to 350;

D are identical or different and are represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O, b=0, 1, 2 or 3, c=0, 1, 2 or 3, where b+c=2 or 3;

$R^{15}$ are identical or different and are represented by H, a non-branched chain or branched $C_1$-$C_4$ alkyl group, CO—$NH_2$, and/or $COCH_3$;

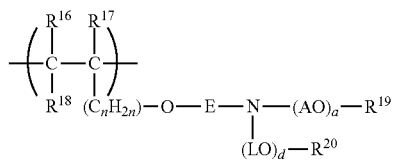

(IIc)

where
$R^{16}$, $R^{17}$ and $R^{18}$ are in each case identical or different and, independently of one another, are represented by H and/or a non-branched chain or branched $C_1$-$C_4$ alkyl group;

E are identical or different and are represented by a non-branched chain or a branched $C_1$-$C_6$ alkylene group, preferably a $C_2$-$C_6$ alkylene group, a cyclohexylen group, $CH_2$—$C_6H_{10}$, ortho-, meta- or para-substituted $C_6H_4$ and/or by a unit not present; preferably E is not a unit not present;

A are identical or different and are represented by $C_xH_{2x}$ where x=2, 3, 4 and/or 5 and/or $CH_2CH(C_6H_5)$;

n are identical or different and are represented by 0, 1, 2, 3, 4 and/or 5;

L are identical or different and are represented by $C_xH_{2x}$ where x=2, 3, 4 and/or 5 and/or $CH_2$—$CH(C_6H_5)$;

a are identical or different and are represented by an integer from 2 to 350;

d are identical or different and are represented by an integer from 1 to 350;

$R^{19}$ are identical or different and are represented by H and/or a non-branched chain or a branched $C_1$-$C_4$ alkyl group, $R^{20}$ are identical or different and are represented by H and/or a non-branched chain $C_1$-$C_4$ alkyl group.

In a further embodiment of the invention a structural unit is produced in the copolymer by incorporation of the polyether macromonomer in the form of polymerized units, which structural unit is in accordance with the general formula (IId)

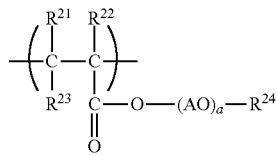

(IId)

where
$R^{21}$, $R^{22}$ and $R^{23}$ are in each case identical or different and, independently of one another, are represented by H and/or a non-branched chain or branched $C_1$-$C_4$ alkyl group;

A are identical or different and are represented by $C_xH_{2x}$ where x=2, 3, 4 and/or 5 and/or $CH_2CH(C_6H_5)$;

a are identical or different and are represented by an integer from 2 to 350;

$R^{24}$ are identical or different and are represented by H and/or a non-branched chain or a branched $C_1$-$C_4$ alkyl group, preferably a $C_1$-$C_4$ alkyl group.

Alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups is preferably used as the polyether macromonomer. Methacrylic acid, acrylic acid, maleic acid, maleic anhydride, a monoester of maleic acid or a mixture of a plurality of these components is preferably used as the acid monomer.

In a further embodiment of the invention the reaction is carried out completely or partially in the presence of an aqueous solution containing a viscosity enhancer polymer, selected from the group of polysaccharide derivatives and/or (co)polymers with an average molecular weight $M_w$ higher than 500.000 g/mol, more preferably higher than 1.000.000 g/mol, the (co)polymers containing structural units derived (preferably by free radical polymerization) from non-ionic (meth)acrylamide monomer derivatives and/or sulphonic acid monomer derivatives. It is possible that the viscosity enhancer polymer is added at the beginning, during the process or at the end of the process. For example it can be added to the aqueous solution of the comb polymer, to the calcium compound and/or the silicate compound. The viscosity enhancer polymer can also be used during the process of preparing a hardening accelerator composition by reaction of a calcium compound, preferably a calcium salt, most preferably a water-soluble calcium salt with a silicon dioxide containing component. Preferably the viscosity enhancer polymer is added at the end of the reaction (at the end of the reactants addition) in order to prevent any particles to be destabilized and to keep the best stability. The viscosity enhancer has a stabilizing function in that segregation (aggregation and sedimentation) of for example calcium silicate hydrate) can be prevented. Preferably the viscosity enhancers are used at a dosage from 0.001 to 10 weight %, more preferably 0.001 to 1 weight % with respect to the weight of the hardening accelerator suspension. The viscosity enhancer polymer preferably should be dosed in a way that a plastic viscosity of the hardening accelerator suspensions higher than 80 mPa·s is obtained.

As polysaccharide derivative preference is given to cellulose ethers, for example alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference is given to methylhydroxyethylcelluose (MHEC) and methylhydroxypropyl-celluose (MHPC). The abovementioned cellulose ether derivatives, which can in each case be obtained by appropriate alkylation or alkoxylation of cellulose, are preferably present as non ionic structures, however it would be possible to use for example also carboxymethylcellulose (CMC). In addition, preference is also given to using non ionic starch ether derivatives such as hydroxypropylstarch, hydroxyethylstarch and methyl-hydroxypropylstarch. Preference is given to hydroxypropylstarch. Preferable are also microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae, in the case of galactomannans from carob seeds.

The viscosity enhancer (co)polymers with a weight average molecular weight $M_w$ higher than 500.000 g/mol, more preferably higher than 1.000.000 g/mol can be produced (preferably by free radical polymerization) from non-ionic (meth)acrylamide monomer derivatives and/or sulphonic acid monomer derivatives. The respective monomers can be selected for example from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of styrene sulphonic acid, 2-acrylamido-2-methylpropanesulphonic acid, 2-methacrylamido-2-methylpropanesulphonic acid, 2-acrylamidobutanesulphonic acid, and/or 2-acrylamido- 2,4,4-trimethylpentanesulphonic acid or the salts of the acids mentioned. It is preferable that the viscosity enhancer contains more than 50 mol %, more preferably more than 70 mol % of structural units derived from non-ionic (meth)acrylamide monomer derivatives and/or sulphonic acid monomer derivatives. Other structural units preferably being contained in the copolymers can be derived from for example the monomers (meth)acrylic acid, esters of (meth)acrylic acid with branched or non-branched C1 to C10 alcohols, vinyl acetate, vinyl proprionate and/or styrene.

In a further embodiment of the invention the viscosity enhancer polymer is a polysaccharide derivative selected from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight $M_w$ higher than 500.000 g/mol, more preferably higher than 1.000.000 g/mol, the (co)polymers containing structural units derived (preferably by free radical polymerization) from non-ionic (meth)acrylamide monomer derivatives selected from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentane-sulphonic acid or the salts of the acids mentioned.

Within the group of non-ionic (meth)acrylamide monomer derivatives preference is given to methylacrylamide, N,N-dimethylacrylamide and/or methacrylamide, and particular preference is given to acrylamide. Within the group of sulphonic acid monomers 2-acrylamido-2-methylpropanesulphonic acid (AMPS) and its salts are preferable. The amines can be added at the beginning of the process or at any other time.

In a further embodiment of the invention the reaction is carried out completely or partially in the presence of an aqueous solution containing hardening accelerators selected from the group of alkanolamines, preferably triisopropanolamine and/or tetrahydroxyethyl ethylene diamine (THEED). Preferably the alkanolamines are used at a dosage from 0.01 to 2.5 weight % with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems. Preferably the amine is added at the end of the reaction.

In another embodiment the reaction is carried out completely or partially in the presence of an aqueous solution containing setting retarders selected from the group of citric acid, tartaric acid, gluconic acid, phosphonic acid, aminotrimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars (e.g. glucose, molasses). The advantage of the addition of setting retarders is that the open time can be controlled and in particular if necessary can be prolonged. The term "open-time" is understood by the person skilled in the art as the time interval after preparing the hydraulic binder mixture until the point of time at which the fluidity is considered as not sufficient anymore to allow a proper workability and the placement of the hydraulic binder mixture. The open-time depends on the specific requirements at the job site and on the type of application. As a rule the precast industry requires between 30 and 45 minutes and the ready-mix concrete industry requires about 90 minutes of open-time. Preferably the setting retarders are used at a dosage from 0.01 to 0.5 weight % with respect to the weight of hydraulic binder, preferably cement. The retarders can be added at the beginning of the process or at any other time.

In a preferred embodiment the hardening accelerator composition obtained according to any of the above mentioned embodiments is dried, preferably by a spray drying process. The drying method is not especially limited, another possible drying method is for example the use of a fluid bed dryer. It is generally known that water, also if only in low quantities, is detrimental to many binders, especially cement, because of undesired premature hydration processes. Powder products with their typically very low content of water are advantageous compared to aqueous systems because it is possible to mix them into cement and/or other binders like gypsum, calcium sulphate hemihydrate (bassanite), anhydrous calcium sulphate, slags, preferably ground granulated blast furnace slag, fly ash, silica dust, metakaolin, natural pozzolan, calcined oil shale, calcium sulphoaluminate cement and/or calcium aluminate cement.

The invention furthermore relates to a hardening accelerator composition which is obtainable by the process described above.

According to another aspect of the invention a composition, preferably aqueous hardening accelerator suspension, containing calcium silicate hydrate and a polycondensate, the polycondensate containing
(I) at least one structural unit consisting of an aromatic or heteroaromatic moiety bearing a polyether side chain and
(II) at least one structural unit consisting of an aromatic or heteroaromatic moiety bearing at least one phosphoric acid ester group and/or its salt, is concerned.

Preferably the composition is free of hydraulic binders, especially free of cement. The analysis of calcium silicate hydrate is possible by X-ray diffraction (XRD) as the calcium silicate hydrate phase of the product is characterized by typical X-ray diffraction (XRD) reflexes in the diffraction pattern. Depending on the formed calcium silicate hydrate phase the peaks vary according to Saito, F.; Mi, G., Hanada, M.: Mechanochemical synthesis of hydrated calcium silicates by room temperature grinding, Solid State Ionics, 1997, 101-103, pp. 37-43. Typical reflexes are at d-values of 11-14 Å, 5.0-5.6 Å, 3.0-3.1 Å, and 2.76-2.83 Å according to a mixture of different calcium silicate hydrate phases like tobermorite and xonotlite with a crystallite size smaller than 20 nm (please compare with the example in FIG. 1).

FIG. 1 shows the X-ray diffraction pattern (XRD) of a sample of calcium silicate hydrate according to this invention, synthesized from $Ca(OH)_2$ and microsilica in liquid suspension with the comb polymer Melflux® 267L and the phosphated polycondensate P1 (please compare with table 1 for the structure of P1) by milling in a planetary ball mill for 80 minutes (Acc. M3 of table 3). The measured curve (2)) is compared with a calculated curve (1)) from the structure of tobermorite (ICSD: 100405) and shows the similarity between tobermorite and the synthesized calcium silicate hydrate sample. The calculation was done by Rietveld refinement with the software Topas 4.2 (Bruker).

FIG. 1: Comparison of diffraction patterns of tobermorite (calculated 1)) and a measured accelerator composition according to this invention (2))

In a preferred embodiment the particle diameter of the calcium silicate hydrate is smaller than 1.000 nm, preferably smaller than 300 nm, more preferably smaller than 200 nm, the particle size of the calcium silicate hydrate being measured by analytical ultracentrifugation.

Preferably the measurement of the particle diameter is done at a temperature of 25° C. via the analytical ultra centrifuge Beckman Model Optima XLI from Beckman Coulter GmbH. The analytical method of ultracentrifugation was chosen because methods like light scattering are not suitable for the particularly small particles of this invention (particularly for diameters below about 100 nm).

According to the description in H. Cölfen, 'Analytical Ultracentrifugation of Nanoparticles', in *Encyclopedia of Nanoscience and Nanotechnology*, (American Scientific Publishers, 2004), pp. 67-88, the particle size distribution is measured via analytical ultracentrifugation as described in the following chapter. For the measurement the commercially available analytical ultra centrifuge "Beckman Model Optima XLI," from Beckman Coulter GmbH, 47807 Krefeld is used.

The samples are diluted with water to a suitable concentration. This concentration is typically between 1 and 40 g/l solid content of the sample (the samples in FIG. 2 were diluted to a concentration of 30 g/l). Preferably a relatively high dilution is chosen. The concentration to be chosen is preferably adapted according to the content of the calcium silicate hydrate particles in the sample to be analyzed. The suitable range can be easily found by the person skilled in the art and is particularly determined by the factors transparency of the sample and the measuring sensitivity. Typically the rotation speed of the ultracentrifuge is selected in the range from 2.000 to 20.000 rotations per minute (in the examples of FIG. 2 the rotation speed was 10.000 rotations per minute). The rotation speed can be chosen according to the needs of the specific sample, a higher speed of the ultracentrifuge will be preferably chosen when relatively small particles are involved and vice versa. The sedimentation rate s of the calcium silicate hydrate particles is measured with interference optics at 25° C. and is extracted from the interference data by a suitable evaluation software, for example Sedfit (http://www.analyticalultracentrifugation.com/default.htm).

According to the Stokes-Einstein Equation $$d = \sqrt{\frac{18\eta s}{\Delta\rho}}$$

the diameter of the particles d can be calculated with the measured sedimentation rate s.

η is the dynamic viscosity of the medium and was measured at 25° C. with a Brookfield LVDV-I viscosimeter at a rotation speed of 5 rounds per minute with the spindle number 1.

s is the sedimentation rate of the particles.

Δρ is the difference of density at 25° C. between the calcium silicate hydrate particles and the medium. The density of the calcium silicate hydrate particles is estimated to be 2.1 g/cm³ according to a comparison with litreature data. The density of the medium is estimated to be 1 g/cm³ (for a diluted aqueous solution). The influence of Δρ on the absolute values of the particle diameter d is supposed to be small and therefore the influence of the estimation of Δρ is also small.

FIG. 2: Particle size distribution of a calcium silicate hydrate, synthesized according to the present invention (1) and according to the state-of-art (2)

The conditions of the measurement were the following: 30 g/l solid content of Acc.1, which equals to an active solid content of about 10 g/l), rotation speed of the ultracentrifuge 10.000 r.p.m, temperature of the measurement 25° C., density of calcium silicate hydrate was estimated to be 2.1 g/cm³ and the density of the medium was estimated to be 1 g/cm³ (for a diluted aqueous system). The dynamic viscosity of the diluted solution was $8.9 \cdot 10^{-4}$ Pa s at 25° C., corresponding to a diluted aqueous system.

FIG. 2 shows the size distribution (mass weighted signal (g(D)) of calcium silicate hydrate particles as a function of the diameter of the particles (under the assumption that the particles are spherical). By the synthesis according to this invention (calcium silicate hydrate particles synthesized in the presence of a polycondensate (here Acc. 1 of table 2)) it is possible to reach a particle size below 1.000 nm, preferably below 300 nm and 200 nm. No particles with a diameter larger than about 130 nm were found in the measurement. The integral in the region from 0 to 150 nm equals to 100%. As a comparison the state-of-art calcium silicate hydrate particles (Acc. 20 in table 2) show no detectable particles in this region. The detected particles were larger than 1.000 nm.

Preferably the aqueous hardening accelerator composition contains i) 0.1 to 75, preferably 0.1 to 50, the most preferably 0.1 to 10% by weight of calcium silicate hydrate, ii) 0.001 to 60, preferably 0.1 to 30, most preferably 0.1 to 10% by weight of polycondensate, iii) 24 to 99, more preferably 50 to 99, most preferably 70 to 99% by weight of water.

Typically the calcium silicate hydrate in the composition, preferably aqueous hardening accelerator suspension, is foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α—$C_2SH$, dellaite, jaffeite, rosenhahnite, killalaite and/or suolunite.

More preferably the calcium silicate hydrate in the composition, preferably aqueous hardening accelerator suspension, is xonotlite, 9 Å—tobermorite (riversiderite), 11 Å—tobermorite, 14 Å—tobermorite (plombierite), jennite, metajennite, afwillite and/or jaffeite.

In a preferred embodiment of the invention the molar ratio of calcium to silicon in the calcium silicate hydrate in the composition, preferably aqueous hardening accelerator suspension, is from 0.6 to 2, preferably 1.1 to 1.8.

In a further preferred embodiment of the invention the molar ratio of calcium to water in the calcium silicate hydrate is from 0.6 to 6, preferably 0.6 to 2, more preferably 0.8 to 2. Said ranges are similar to those found for example in calcium silicate hydrate phases, which are formed during the hydration of cement. Advantage is a good acceleration effect for hydraulic binders.

Typically the structural units (I) and (II) of the polycondensate are represented by the following general formulae

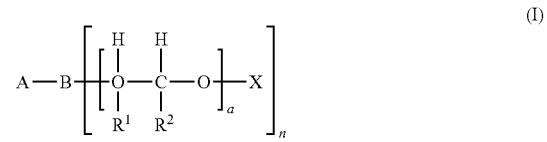

where
A are identical or different and are represented by a substituted or unsubstituted aromatic or heteroaromatic compound having 5 to 10 C atoms
where
B are identical or different and are represented by N, NH or O
where
n is 2 if B is N and n is 1 if B is NH or O
where
$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
a are identical or different and are represented by an integer from 1 to 300
where
X are identical or different and are represented by a branched or straight-chain $C_1$- to $C_{10}$-alkyl radical, $C_5$- to $C_8$-cycloalkyl radical, aryl radical, heteroaryl radical or H, preferably H

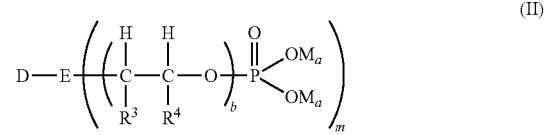

where
D are identical or different and are represented by a substituted or unsubstituted heteroaromatic compound having 5 to 10 C atoms
where
E are identical or different and are represented by N, NH or O
where
m is 2 if E is N and m is 1 if E is NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
b are identical or different and are represented by an integer from 1 to 300
where
M is independently of one another an alkaline metal ion, alkaline earth metal ion, ammonium ion, organic ammonium ion and/or H,
a is 1 or in the case of alkaline earth metal ions ½.

Typically the molar ratio of the structural units (I):(II) is 1:10 to 10:1 preferably 1:8 to 1:1.

In a further embodiment of the invention the polycondensate contains a further structural unit (III) which is represented by the following formula

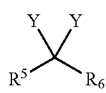

(III)

where
Y, independently of one another, are identical or different and are represented by (I), (II), or further constituents of the polycondensate
where
$R^5$ are identical or different and are represented by H, $CH_3$, COOH or a substituted or unsubstituted aromatic or heteroaromatic compound having 5 to 10 C atoms
where
$R^6$ are identical or different and are represented by H, $CH_3$, COOH or a substituted or unsubstituted aromatic or heteroaromatic compound having 5 to 10 C atoms.

Typically $R^5$ and $R^6$ in structural unit (III), independently of one another, are identical or different and are represented by H, COOH and/or methyl, preferably H.

Preferably the molar ratio of the structural units [(I)+(II)]:(III) is 1:0.8 to 3 in the polycondensate.

In a preferred embodiment a water-soluble comb polymer suitable as a plasticizer for hydraulic binders, preferably a comb polymer obtainable by radical polymerization of unsaturated monomers, is present in the composition, preferably the aqueous hardening accelerator suspension.

Preferably the composition according to this invention contains besides the polycondensate a second polymer. The second polymer is preferably a water-soluble comb polymer suitable as a plasticizer for hydraulic binders, preferably a comb polymer obtainable by radical polymerization of unsaturated monomers.

In a further preferred embodiment of the invention the water-soluble comb polymer suitable as a plasticizer for hydraulic binders in the composition, preferably aqueous hardening accelerator suspension, is present as a copolymer which contains, on the main chain, side chains having ether functions and acid functions.

In a further preferred embodiment of the invention the water-soluble comb polymer suitable as a plasticizer for hydraulic binders in the composition, preferably aqueous hardening accelerator suspension, is present as a copolymer which is produced by free radical polymerization in the presence of acid monomer, preferably carboxylic acid monomer, and polyether macromonomer, so that altogether at least 45 mol %, preferably at least 80 mol %, of all structural units of the copolymer are produced by incorporation of acid monomer, preferably carboxylic acid monomer and polyether macromonomer in the form of polymerized units.

In a further embodiment of the invention a composition, preferably an aqueous hardening accelerator suspension is concerned in which a structural unit is produced in the copolymer by incorporation of the acid monomer in the form of polymerized units, which structural unit is in accordance with the general formulae (Ia), (Ib), (Ic) and/or (Id). The general formulae (Ia), (Ib), (Ic) and/or (Id) were described in detail in the before standing text and are not repeated here in order to avoid unnecessary repetitions. Said formulae are to be regarded as inserted here in detail.

In a further embodiment of the invention, a composition, preferably an aqueous hardening accelerator suspension is concerned in which a structural unit is produced in the copolymer by incorporation of the polyether macromonomer in the form of polymerized units, which structural unit is in accordance with the general formulae (IIa), (IIb) and/or (IIc).

The polyether macromonomer can also be a structural unit in accordance with general formula (IId). The general formulae (IIa), (IIb) and/or (IIc) and also (IId) were described in detail in the before standing text and are not repeated here in order to avoid unnecessary repetitions. Said formulae are to be regarded as inserted here in detail.

Preferably the hardening accelerator suspension contains a viscosity enhancer polymer, selected from the group of polysaccharide derivatives and/or (co)polymers with an average molecular weight $M_w$ higher than 500.000 g/mol, more preferably higher than 1.000.000 g/mol the (co)polymers containing structural units derived (preferably by free radical polymerization) from non-ionic (meth)acrylamide monomer derivatives and/or sulphonic acid monomer derivatives. Preferably the viscosity enhancers are used at a dosage from 0.001 to 10 weight %, more preferably 0.001 to 1 weight % with respect to the weight of the hardening accelerator suspension. The viscosity enhancer polymer preferably should be dosed in a way that a plastic viscosity of the hardening accelerator suspensions higher than 80 mPa·s is obtained. Details of the viscosity enhancer polymers are given in the previous text (in the description of the process), which is incorporated here.

It is particularly advantageous to use the hardening accelerators according to this invention in combination with cements containing a relatively high content of soluble sulphates (from 0.1 to 5 weight % with respect to the cement). Such cements are commercially available or the water-soluble sulphate salt can be added to the cement. Said cement is preferably rich in anhydrous aluminate phases. Preferably the water-soluble sulphate is selected from sodium and/or potassium sulphate. Combining the soluble sulphates and hardening accelerators according to this invention results into a synergetic hardening acceleration effect of cement.

The composition, preferably hardening accelerator suspension, contains preferably hardening accelerators selected from the group of alkanolamines, preferably triisopropanolamine and/or tetrahydroxyethyl ethylene diamine (THEED). Preferably the alkanolamines are used at a dosage from 0.01 to 2.5 weight % with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems.

The composition, preferably aqueous hardening accelerator suspension, contains preferably setting retarders selected from the group of citric acid, tartaric acid, gluconic acid, phosphonic acid, amino-trimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars (e.g. glucose, molasses). The advantage of the addition of setting retarders is that the open-time can be controlled and in particular if necessary can be prolonged. Preferably the setting retarders are used at a dosage from 0.01 to 0.5 weight % with respect to the weight of hydraulic binder, preferably cement.

The compositions, preferably aqueous hardening accelerator suspensions can also contain any formulation component typically used in the field of construction chemicals, preferably defoamers, air entrainers, retarders, shrinkage reducers, redispersible powders, other hardening accelerators, anti-freezing agents and/or anti-efflorescence agents.

In a preferred embodiment of the invention the composition is in powder form. The powder product can be obtained from the aqueous product by for example spray drying or drying in a fluid bed dryer.

The invention comprises the use of a hardening accelerator composition obtainable according to any of the processes of the present invention or of a composition according to this invention, preferably an aqueous hardening accelerator suspension, in building material mixtures containing cement, gypsum, anhydrite, slag, preferably ground granulated blast furnace slag, fly ash, silica dust, metakaolin, natural pozzolans, calcined oil shale, calcium sulphoaluminate cement and/or calcium aluminate cement, preferably in building material mixtures which contain substantially cement as a hydraulic binder. Gypsum comprises in this context all possible calcium sulphate carriers with different amounts of crystal water molecules, like for example also calcium sulphate hemihydrate.

The invention comprises the use of a hardening accelerator composition according to this invention for reducing the permeability, preferably the water penetration depth according to DIN EN 12390-8. of hardened building material mixtures with respect to aqueous liquids, the building material mixtures containing cement, gypsum, anhydrite, slag, preferably ground granulated blast furnace slag, fly ash, silica dust, metakaolin, natural pozzolans, calcined oil shale, calcium sulpho aluminate cement and/or calcium aluminate cement, preferably the building material mixtures contain substantially cement as a hydraulic binder.

The permeability of building materials with respect to water and aqueous liquids is a parameter, which has an important influence on the durability of concrete. Damage to concrete structures for example is to a very high degree due to the ingress of water from the environment. The term "aqueous liquids" means in this context water, which might contain aggressive substances like salts (e.g. chloride ions, sulphate ions . . . ) For building material mixtures it is decisive that the permeation of water can be reduced in order to obtain a higher durability.

The measurement of the water penetration depth is a good indicator how a cementitious material can resist to damages from the environment, for example leaching, weathering or sulphate attack. The test shows in how far a material can be impermeable to the penetration of aggressive aqueous agents. A decrease of the water penetration depth is consequently information about the durability of the concrete. A long durability is a very important property required by concrete producers and contractors. The reduced water penetration depths found in the experimental tests using the accelerator compositions of this invention were very surprising. It is believed that the positive effect of the accelerators on this material property is due to different structures of the hydration products in the concrete, which reduce the porosity of the concrete.

In an embodiment of the invention building material mixtures are concerned, which contain a composition, preferably an aqueous hardening accelerator suspension, according to this invention and cement, gypsum, anhydrite, slag, preferably ground granulated blast furnace slag, fly ash, silica dust, metakaolin, natural pozzolans, calcined oil shale, calcium sulpho aluminate cement and/or calcium aluminate cement. Preferably the building material mixtures contain substantially cement as a hydraulic binder. The hardening accelerator composition is contained in the building material mixture preferably at a dosage of 0.05 weight % to 5 weight % with respect to the clinker weight.

For illustration the term building material mixtures can mean mixtures in dry or aqueous form and in the hardened or plastic state. Dry building material mixtures could be for example mixtures of said binders, preferably cement and the hardening accelerator compositions (preferably in powder form) according to this invention. Mixtures in aqueous form, usually in the form of slurries, pastes, fresh mortar or fresh concrete are produced by the addition of water to the binder component(s) and the hardening accelerator composition, they transform then from the plastic to the hardened state.

EXAMPLES

Preparation of Phosphated Polycondensates (General Procedure)

A reactor, equipped with heating and stirrer is charged with a compound according to structural unit (I), for example polyethylenglycol monophenylether (in the following called PhPEG), a compound according to structural unit (II), for example polyethylenglycol monophenylether phosphate or phenoxyethanol phosphate (in the following called "phosphate") and a keton compound (IIIa), for example formaldehyde (paraformaladehyde can be used as well as aqueous formaldehyde or trioxane). The reaction mixture is heated to temperatures typically between 90° C. and 120° C. and the polycondensation is started by the addition of the acid catalyst (typically sulfuric acid or methansulfonic acid). Typically the reaction mixture is stirred for 1 to 6 hours until the desired molecular weight range has been achieved. The polycondensate is than diluted with water and neutralized to obtain a solution with 25-80 weight % solid content. Details of the process and the respective monomers according to the general procedure are summarized in table 1. In the table "Phosphate" type A means phenoxyethanol phosphate, B is polyethylenglycol monophenylether phosphate with 4 to 5 ethylene glycol units in average and C means polyethylenglycol monophenylether phosphate with 3 to 4 ethylene glycol units in average. The formaldehyde source F is a 30.5% aqueous solution of formaldehyde, P is paraformaldehyde and T is trioxane. The Acid type S is sulphuric acid and M is methane sulfonic acid.

TABLE 1

Polymer composition of phosphated polycondensates

| Example | PhPEG Mn [g/mol] [g] | "Phosphate" type [g] | $CH_2O$ source [g] | Acid type [g] | Reaction Temp. [° C.] | Reaction Time [min] | Solid Content [%] | Mol. Weight $M_w$ [g/mol] |
|---|---|---|---|---|---|---|---|---|
| P1 | 5000 800 | B 140 | PF 58 | S 32 | 110 | 300 | 47.2 | 34200 |
| P2 | 3500 175 | B 36.8 | PF 6.3 | M 14 | 100 | 360 | 43.4 | 27680 |

Preparation of Accelerator Compositions (Reaction of Calcium Compound and Silicate Compound)

Table 2 shows the details of different recipes and synthesis conditions used for each accelerator composition. For preparing the accelerator compositions it is possible to work with two solutions. In this case the respective reactants (solution 1 contains the silicate compound and solution 2 contains the calcium compound and at least one of the solutions 1 or 2 contains the polycondensate and optionally comb polymer(s)) are mixed together. Alternatively a third solution can be used (solution 3 contains polymers, especially a polycondensate according to this invention, optionally also in combination with a comb polymer). It is also possible that the polymer(s) are distributed to the solutions 1, 2 and 3 according to the weight percentages given in table 2. These solutions are prepared before starting the reaction by dissolving the water-soluble salts and mixing polymers in water at room temperature until the complete dissolution. The reaction is started by feeding the respective solutions according to the mixing procedure indications in table 2 at a certain addition rate under mechanical stirring. The stirring rate(s) and the temperature are controlled during the whole synthesis. After the addition of the reactants, the suspension is further mixed for 30 minutes and afterwards collected and stored. The amounts are adjusted for achieving around 1 kg of suspension at the end of the synthesis. The solid content of the suspension is measured by drying 3 g+/−0.1 g of the suspension in a crucible in porcelain 24 hours in an oven at 60° C.

The active solid content is calculated with the following method. We consider that the active content is the total solid weight (given by the measured solid content) minus the organic part, minus the sodium ions and minus the nitrate ions. The organic part, the sodium and nitrate ions are simply deducted from syntheses.

The comb-type polymer Glenium® ACE30 is a commercialized polycarboxylate ether (obtainable from BASF Italia S.p.A.) basing on the monomers maleic acid, acrylic acid, vinyloxybutyl-polyethyleneglycol-5800 ($M_w$=40.000 g/mol (measured by G.P.C); the solid content of the sample is 45 weight %). In the tables the quantities of the phosphated polycondensates and the comb-type plasticizers are always expressed in g of total solution.

DF93 is a commercial defoamer (obtainable from BASF Construction Polymers GmbH). The amounts of DF93 used during syntheses are expressed in weight of dried solid. Concerning the accelerator composition 31, 2 g of VM1 as powder is very slowly added after the addition of calcium nitrate and sodium silicate. The viscosity modifier VM1 is a copolymer (Mw=500.000 g/mol) made from 2-Acrylamido-2-methyl-propansulfonsäure and N,N-dimethylacrylamide with a molar ratio of 1. After the addition of VM1, the suspension was stirred 12 hours.

Synthesis of Comparison Examples

The accelerator compositions 19, 20 and 21 are synthesized here as comparison examples and do not contain any polycondensate, comb polymer or other organic additives. The obtained precipitates are calcium silicate hydrates free of polymers. Concerning the accelerator 21, after the aqueous synthesis, the suspension is filtrated at a pressure of 8 bars of nitrogen gas and with a filter having 0.1 micrometer pores. Then, a wet product is obtained and washed with 1 litre of saturated calcium hydroxide solution, always under filtration. After the filtration, the product is collected and further dried for 24 hours at 60° C. in an oven. After this drying step, the powder is finally crushed manually in a mortar with a pestle. The accelerator 21 is a powder of calcium silicate hydrate free of polymers.

TABLE 2

Preparation of accelerator samples

| ID | Quantity and type of Polymers used | Composition of Solution 1 | Composition of Solution 2 | Composition of Solution 3 |
|---|---|---|---|---|
| Acc. 1 | 53.84 g Glenium ACE30 + 20.63 g EPPR2 | 93.72 g Na2SiO3•5 H2O + 263.3 g Water | 117.3 g Ca(NO3)2 + 108.11 g Water | Polymers + 343.1 g Water |
| Acc. 2 | 30.3 g Glenium ACE30 + 10.5 g EPPR2 | 39.71 g Na2SiO3•5 H2O + 111.6 g Water | 49.65 g Ca(NO3)2 + 45.76 g Water | Polymers + 712.5 g Water |
| Acc. 3 | 13 g Glenium ACE30 + 0.96 g DF93 | 10.66 g Na2SiO3•5 H2O + 29.99 g Water | 12.03 g Ca(NO3)2 + 11.09 g Water | Polymers + 922.76 g Water |
| Acc. 4 | 30.36 g Glenium ACE30 + 5.26 g EPPR2 | 39.8 g Na2SiO3•5 H2O + 111.83 g Water | 49.77 g Ca(NO3)2 + 84.49 g Water | Polymers + 678.49 g Water |
| Acc. 5 | 30.36 g Glenium ACE30 + 5.26 g EPPR2 | 39.8 g Na2SiO3•5 H2O + 111.83 g Water | 49.77 g Ca(NO3)2 + 136.75 g Water | Polymers + 626.23 g Water |
| Acc. 6 | 30.36 g Glenium ACE30 + 5.26 g EPPR2 | 39.80 Na2SiO3•5 H2O + 164.36 g Water | 49.77 g Ca(NO3)2 + 66.85 g Water | Polymers + 643.6 g Water |
| Acc. 7 | 30.36 g Glenium ACE30 + 5.26 g EPPR2 | 39.80 g Na2SiO3•5 H2O + 286.246 g Water | 49.77 g Ca(NO3)2 + 66.85 g Water | Polymers + 521.71 g Water |
| Acc. 8 | 30.3 g Glenium ACE30 + 10.5 g EPPR2 | 39.71 g Na2SiO3•5 H2O + 111.6 g Water | 49.65 g Ca(NO3)2 + 45.76 g Water + 10% EPPR2 | 100% Glenium ACE30 + 90% EPPR2 + 712.5 g Water |
| Acc. 9 | 30.3 g Glenium ACE30 + 10.5 g EPPR2 | 39.71 g Na2SiO3•5 H2O + 111.6 g Water + 10% of Polymers | 49.65 g Ca(NO3)2 + 45.76 g Water | 90% Polymers + 712.5 g Water |
| Acc. 10 | 30.3 g Glenium ACE30 + 10.5 g EPPR2 | 39.71 g Na2SiO3•5 H2O + 111.6 g Water + 50% of Polymers | 49.65 g Ca(NO3)2 + 45.76 g Water | 50% Polymers + 712.5 g Water |
| Acc. 11 | 30.3 g Glenium ACE30 + 10.5 g EPPR2 | 39.71 g Na2SiO3•5 H2O + 111.6 g Water | 49.65 g Ca(NO3)2 + 45.76 g Water + 10% of the Polymers | 100% Glenium ACE30 + 90% Polymers + 712.5 g Water |
| Acc. 12 | 30.3 g Glenium ACE30 + 10.5 g EPPR2 | 39.71 g Na2SiO3•5 H2O + 111.6 g Water + 10% of the Glenium ACE30 | 49.65 g Ca(NO3)2 + 45.76 g Water | 90% Glenium Ace30 + 712.5 g Water |

TABLE 2-continued

Preparation of accelerator samples

| | | | | |
|---|---|---|---|---|
| Acc. 13 | 30.3 g Glenium ACE30 + 10.5 g EPPR2 | 39.71 g Na2SiO3•5 H2O + 111.6 g Water + 10% of the EPPR2 | 49.65 g Ca(NO3)2 + 45.76 g Water | 90% EPPR2 + 712.5 g Water |
| Acc. 14 | 68.79 g Glenium ACE30 + 27.77 g EPPR2 | 106.89 g Na2SiO3•5 H2O + 301.05 g Water | 133.79 g Ca(NO3)2 + 123.30 g Water | Polymer + 233.16 g Water |
| Acc. 15 | 15.68 g EPPR2 + 0.96 g DF93 | 10.64 g Na2SiO3•5 H2O + 29.98 g Water | 11.99 g Ca(NO3)2 + 11.05 g Water | Polymers + 920.2 g Water |
| Acc. 16 | 53.84 g Glenium ACE30 + 20.64 g EPPR2 | 93.73 g Na2SiO3•5 H2O + 263.32 g Water | 117.3 g Ca(NO3)2 + 153.25 g Water | Polymers + 297.92 g Water |
| Acc. 17 | 53.84 g Glenium ACE30 + 20.64 g EPPR2 | 93.73 g Na2SiO3•5 H2O + 263.32 g Water | 117.3 g Ca(NO3)2 + 153.25 g Water | Polymers + 297.92 g Water |
| Acc. 18 | 53.84 g Glenium ACE30 + 20.64 g EPPR2 | 93.73 g Na2SiO3•5 H2O + 263.32 g Water | 117.3 g Ca(NO3)2 + 153.25 g Water | Polymers + 297.92 g Water |
| Acc. 19 | No Polymer | 39.71 g Na2SiO3•5 H2O + 111.6 g Water | 49.65 g Ca(NO3)2 + 45.76 g Water | 732.4 g Water |
| Acc. 20 | No Polymer | 93.72 g Na2SiO3•5 H2O + 263.3 g Water | 117.3 g Ca(NO3)2 + 108.11 g Water | 380.2 g Water |
| Acc. 21 | No Polymer | 39.71 g Na2SiO3•5 H2O + 111.6 g Water | 49.65 g Ca(NO3)2 + 45.76 g Water | 732.4 g Water |
| Acc. 22 | 29.76 g Glenium ACE30 + 10.25 g EPPR2 | 52.01 g Na2SiO3•5 H2O + 135.33 g Water | 58.6 g CaCl2 + 90.38 g Water | Polymers + 623.6 g Water |
| Acc. 23 | 29.66 g Glenium ACE30 + 12.39 g EPPR2 | 63.28 g Na2SiO3•5 H2O + 164.63 g Water | 71.35 g CaCl2 + 110.03 g Water | Polymers + 541.9 g Water |
| Acc. 24 | 35.89 g Glenium ACE30 + 14.66 g EPPR2 | 74.29 g Na2SiO3•5 H2O + 193.29 g Water | 83.69 g CaCl2 + 129.06 g Water | Polymers + 469.1 g Water |
| Acc. 25 | 37.67 g Glenium ACE30 + 19.49 g EPPR2 | 74.07 g Na2SiO3•5 H2O + 192.72 g Water | 83.43 g CaCl2 + 128.676 g Water | Polymers + 463.86 g Water |
| Acc. 26 | 53.84 g Glenium ACE30 + 20.64 g EPPR2 + 1.32 g DF93 | 93.72 g Na2SiO3•5 H2O + 263.3 g Water | 117.3 g Ca(NO3)2 + 108.11 g Water | Polymers + 342.4 g Water |
| Acc. 27 | 53.84 g Glenium ACE30 + 20.64 gEPPR2 + 1.02 g DF93 | 93.72 g Na2SiO3•5 H2O + 263.3 g Water | 117.3 g Ca(NO3)2 + 108.11 g Water | Polymers + 342.7 g Water |
| Acc. 28 | 68.79 g Glenium ACE30 + 27.9 g EPPR2 + 3.8 g DF93 | 106.9 g Na2SiO3•5 H2O + 300.81 g Water | 133.79 g Ca(NO3)2 + 123.3 g Water | Polymers + 230.74 g Water |
| Acc. 29 | 68.79 g Glenium ACE30 + 27.77 g EPPR2 | 106.9 g Na2SiO3•5 H2O + 300.05 g Water | 133.79 g Ca(NO3)2 + 123.3 g Water | Polymers + 233.16 g Water |
| Acc. 30 | 68.79 g Glenium ACE30 + 27.77 g EPPR2 | 106.9 g Na2SiO3•5 H2O + 300.05 g Water | 133.79 g Ca(NO3)2 + 123.3 g Water | Polymers + 233.16 g Water |
| Acc. 31 | 68.79 g Glenium ACE30 + 27.9 g EPPR2+ 3.8 g DF93 At the end of addition of reactants, 2 g of VM1 is added to the mix. | 106.9 g Na2SiO3•5 H2O + 300.81 g Water | 133.79 g Ca(NO3)2 + 123.3 g Water | Polymers + 230.74 g Water |
| Acc. 32 | 13.52 g EPPR2 | 10.66 g Na2SiO3•5 H2O + 29.95 g Water | 12 g Ca(NO3)2 + 11.06 g Water | Polymers + 919.76 g Water |
| Acc. 33 | 15.75 g EPPR2 | 10.65 g Na2SiO3•5 H2O + 29.96 g Water | 11.99 g Ca(NO3)2 + 11.05 g Water | Polymer + 920.1 g Water |
| Acc. 34 | 15.75 g EPPR2 + 0.192 g DF93 | 10.65 g Na2SiO3•5 H2O + 29.96 g Water | 11.99 g Ca(NO3)2 + 11.05 g Water | Polymer + 920.1 g Water |
| Acc. 35 | 15.75 g EPPR2 + 0.96 g DF93 | 10.65 g Na2SiO3•5 H2O + 29.96 g Water | 11.99 g Ca(NO3)2 + 11.05 g Water | Polymer + 920.1 g Water |

| ID | Mixing Procedure with feeding rates | | T° C. | Stirring Rate (rpm) | Total Solid Content |
|---|---|---|---|---|---|
| Acc. 1 | 1 in 3 at 45 ml/hour | 2 in 3 at 91.8 mL/hour | 20° | 300 | 21.50% |
| Acc. 2 | 1 in 3 at 103.8 ml/hour | 2 in 3 at 51 mL/hour | 20° | 300 | 9.90% |
| Acc. 3 | 1 in 3 at 69.6 ml/hour | 2 in 3 at 31.2 mL/hour | 20° | 300 | 2.40% |
| Acc. 4 | 1 in 3 at 103.8 ml/hour | 2 in 3 at 81 mL/hour | 20° | 300 | 9.50% |
| Acc. 5 | 1 in 3 at 103.8 ml/hour | 2 in 3 at 121.2 mL/hour | 20° | 300 | 9.50% |
| Acc. 6 | 1 in 3 at 145.8 ml/hour | 2 in 3 at 60.6 mL/hour | 20° | 300 | 9.50% |
| Acc. 7 | 1 in 3 at 243 ml/hour | 2 in 3 at 60.6 mL/hour | 20° | 300 | 9.50% |
| Acc. 8 | 1 in 3 at 103.8 ml/hour | 2 in 3 at 51.6 mL/hour | 20° | 300 | 9.80% |
| Acc. 9 | 1 in 3 at 107.1 ml/hour | 2 in 3 at 51 mL/hour | 20° | 300 | 9.40% |
| Acc. 10 | 1 in 3 at 117.8 ml/hour | 2 in 3 at 51 mL/hour | 20° | 300 | 9.20% |

TABLE 2-continued

Preparation of accelerator samples

| | | | | | |
|---|---|---|---|---|---|
| Acc. 11 | 1 in 3 at 103.8 ml/hour | 2 in 3 at 53.2 mL/hour | 20° | 300 | 9.60% |
| Acc. 12 | 1 in 3 at 105.9 ml/hour | 2 in 3 at 51 mL/hour | 20° | 300 | 9.60% |
| Acc. 13 | 1 in 3 at 104.5 ml/hour | 2 in 3 at 51 mL/hour | 20° | 300 | 9.40% |
| Acc. 14 | immediate addition | immediate addition | 20° | 300 | 25.90% |
| Acc. 15 | 1 in 3 at 69.6 ml/hour | 2 in 3 at 31.2 mL/hour | 20° | 300 | 27.90% |
| Acc. 16 | 1 in 3 at 91.8 ml/hour | 2 in 3 at 53.4 mL/hour | 20° | 300 | 21.50% |
| Acc. 17 | 1 in 3 at 91.8 ml/hour | 2 in 3 at 53.4 mL/hour | 15° | 300 | 21.60% |
| Acc. 18 | 1 in 3 at 91.8 ml/hour | 2 in 3 at 53.4 mL/hour | 1° | 300 | 21.50% |
| Acc. 19 | 1 in 3 at 103.8 ml/hour | 2 in 3 at 51 mL/hour | 20° | 300 | 7.90% |
| Acc. 20 | 1 in 3 at 45 ml/hour | 2 in 3 at 91.8 mL/hour | 20° | 300 | 18.90% |
| Acc. 21 | 1 in 3 at 103.8 ml/hour | 2 in 3 at 51 mL/hour | 20° | 300 | 100% |
| Acc. 22 | 1 in 3 at 91.14 ml/hour | 2 in 3 at 59.4 mL/hour | 20° | 200 | 9.25% |
| Acc. 23 | 1 in 3 at 79.2 ml/hour | 2 in 3 at 54.6 mL/hour | 20° | 200 | 11.30% |
| Acc. 24 | 1 in 3 at 90.6 ml/hour | 2 in 3 at 67.8 mL/hour | 20° | 200 | 13.86% |
| Acc. 25 | 1 in 3 at 90.6 ml/hour | 2 in 3 at 67.8 mL/hour | 20° | 200 | 13.20% |
| Acc. 26 | 1 in 3 at 45 ml/hour | 2 in 3 at 91.8 mL/hour | 20° | 300 | 21.50% |
| Acc. 27 | 1 in 3 at 45 ml/hour | 2 in 3 at 91.8 mL/hour | 20° | 300 | 21.20% |
| Acc. 28 | 1 in 3 at 105 ml/hour | 2 in 3 at 52.2 mL/hour | 20° | 300 | 25.00% |
| Acc. 29 | 1 in 3 at 87.6 ml/hour | 2 in 3 at 43.8 mL/hour | 20° | 150 | 25.30% |
| Acc. 30 | 1 in 3 at 87.6 ml/hour | 2 in 3 at 43.8 mL/hour | 20° | 50 | 25.70% |
| Acc. 31 | 1 in 3 at 105 ml/hour | 2 in 3 at 52.2 mL/hour | 20° | 300 | 24.98% |
| | At the end of addition of reactants, 2 g of VM1 is added to the mix. | | | | |
| Acc. 32 | 1 in 3 at 69.6 ml/hour | 2 in 3 at 31.2 mL/hour | 20° | 300 | 2.40% |
| Acc. 33 | 1 in 3 at 69.6 ml/hour | 2 in 3 at 31.2 mL/hour | 20° | 300 | 2.40% |
| Acc. 34 | 1 in 3 at 69.6 ml/hour | 2 in 3 at 31.2 mL/hour | 20° | 300 | 2.70% |
| Acc. 35 | 1 in 3 at 69.6 ml/hour | 2 in 3 at 31.2 mL/hour | 20° | 300 | 2.80% |

Preparation of Accelerator Compositions (Reaction of Calcium Compound and Silicon Dioxide Containing Compound)

$Ca(OH)_2$ powder and fumed silica (Sigma Aldrich) were used as starting materials for synthesis. 14.83 g of $Ca(OH)_2$ was mixed with 153 g $CO_2$ free water in which 5.37 g of the used polymer was dissolved. 12.01 g of fumed $SiO_2$ (Sigma Aldrich) was mixed with the $Ca(OH)_2$ slurry. The resulting slurry was put into a planetary ball mill (Fritsch Pulverisette 4) equipped with $ZrO_2$ grinding tools of 250 ml in volume. 100 grinding bodies with 10 mm in diameter were used. The relative ratio of the rotations during the grinding process was −2.18. The total grinding time was 80 minutes, stopped after each 20 minutes for holding temperature in the paste below 70° C. Grinding bodies were separated after the milling process by sieving the paste and rinsing with $CO_2$ free water. The resulting suspension has a solid content of 13.5 weight % determined after heating the suspension for 14 hours at 45° C. and reaching a constant weight.

As polymers were used:
(i) comb-type polymer Melflux® PCE 267L/40% N.D. (commercial polycarboxylate ether, $M_w$=70.000 g/mol measured by G.P.C.)
(ii) polycondensate, according to example 1 of the invention (indicated as P1)

In table 3 are summarized the different accelerator types synthesized by the procedure described above. The weight of polymers is according to the solid content of the polymer suspensions.

TABLE 3 composition of hardening accelerators

| ID | Polymer | Weight polymer [g] | Solid content of suspension (%) |
|---|---|---|---|
| Acc. M1 | — | — | 5.5 |
| Acc. M2 | P1 | 5.37 | 11.5 |
| Acc. M3 | Melflux ® 267L/40% | 0.51 | 26.9 |
| | P1 | 4.65 | |

Accelerator M1 is the reference accelerator which was synthesized without polymer according the process described above.

Concrete Tests—Compressive Strength

Preparation and Concrete Formulation

According to DIN-EN 12390, concrete mixes consist of (given for 1 m³):
320 kg of cement
123 kg of quartz sand 0/0.5
78 kg of quartz sand 0/1
715 kg of sand 0/4
424 kg of gravel (4/8)
612 kg of gravel (8/16)
150 litres of water
if the water-to-cement ratio (W/C) is 0.47;
or
400 kg of cement
78 kg of quartz sand 0/0.5
97 kg of quartz sand 0/1
732 kg of sand 0/4
301 kg of gravel (4/8)
681 kg of gravel (8/16)
148 litres of water
if the water-to-cement ratio (W/C) is 0.37
and additives like for example plasticizer and accelerator.
The indicated amounts of water include the water, which is contained in the added plasticizer and/or accelerator composition.

Glenium® ACE30 is usually added as superplasticizer at the end of the mixing process, the dosage is expressed as weight percentage of solid content with respect to the cement weight.

The accelerator compositions to be tested are added to the mixing water before the mixing with the cement. The quantity of accelerators added is given in percentage of suspension weight (including water) with respect to the cement weight and in brackets in percentage of active solid content weight with respect to the cement weight. This notation is adopted in the whole document when an accelerator is used in a formulation with cement.

Tetrahydroxethyl ethylene diamine (THEED) and triisopropanolamine (TIPA) are dosed in percentage of solid content with respect to the cement weight.

After preparation of the concrete mixes, test specimens [cubes having an edge length of 15 cm] are produced according to DIN-EN 12390-2, compacted with a vibration table and are stored at the desired curing temperature (5° C., 20° C. or 50° C.), and the compressive strength is determined after various times.

The accelerator compositions are compared with well-known accelerators like calcium chloride and calcium nitrate. The comparison accelerators are also dosed in percentage of solid content with respect to the cement weight. They are also mixed directly into the mixing water.

Four different cements (C1 to C4) or different batches from the same cement were used. All the cements are commercialized by the company Schwenk.

Details of the concrete experiments and results are summarized in Table 4.

The concrete reference mixes (please refer to Table 4) which do not contain any accelerator are the mixes No. 1, 7 and 15. The concrete mixes containing usual accelerators (state-of-art accelerators like calcium chloride, calcium nitrate or amines), used here as comparison examples, are the mixes No. 2-4, 8-10, 16-19, 24, 25, 31 and 32. According to this invention are the mixes No. 5, 6, 11-14, 20-23, 26-30, and 33-36.

TABLE 4

Concrete test results

| N° Mix | CEM [kg] | W/C | Plasticizer | ACCELERATOR USED | Curing Temp. [° C.] | Compressive Strength (MPa) | | | |
|---|---|---|---|---|---|---|---|---|---|
| | | | | | | After 6 hours | After 8 hours | After 10 hours | After 28 days |
| 1 | 320 kg C1 | 0.47 | 0.14% Glenium ACE30 | | 20° C. | n.p. | 1.7 | 4.3 | 77.8 |
| 2 | 320 kg C1 | 0.47 | 0.13% Glenium ACE30 | 1% Ca(NO3)2 | 20° C. | 1.4 | 4.8 | 10.6 | 79.7 |
| 3 | 320 kg C1 | 0.47 | 0.11% Glenium ACE30 | 2% Ca(NO3)2 | 20° C. | 3.8 | 7.2 | 8.3 | 80.6 |
| 4 | 320 kg C1 | 0.47 | 0.11% Glenium ACE30 | 1% CaCl2 | 20° C. | 1.4 | 5.1 | 10 | 79.2 |
| 5 | 320 kg C1 | 0.47 | 0.12% Glenium ACE30 | 6.4% Acc. 25 (0.35%) | 20° C. | 4 | 9.6 | 17.7 | 78.9 |
| 6 | 320 kg C1 | 0.47 | 0.13% Glenium ACE30 | 4.5% Acc. 27 (0.35%) | 20° C. | 7.3 | 17.5 | 26.8 | 81.7 |
| 7 | 320 kg C2 | 0.47 | 0.14% Glenium ACE30 | | 20° C. | 1.2 | 3.5 | 7.7 | |
| 8 | 320 kg C2 | 0.47 | 0.12% Glenium ACE30 | 1% CaCl2 | 20° C. | 6.2 | 12.8 | 19.9 | |
| 9 | 320 kg C2 | 0.47 | 0.12% Glenium ACE30 | 1% Ca(NO3)2 | 20° C. | 2.5 | 5.9 | 12.7 | |
| 10 | 320 kg C2 | 0.47 | 0.11% Glenium ACE30 | 2% Ca(NO3)2 | 20° C. | 4.2 | 9.6 | 14.2 | |

TABLE 4-continued

Concrete test results

| N° Mix | CEM [kg] | W/C | Plasticizer | ACCELERATOR USED | Curing Temp. [°C.] | Compressive Strength (MPa) | | | |
|---|---|---|---|---|---|---|---|---|---|
| | | | | | | After 6 hours | After 8 hours | After 10 hours | After 28 days |
| 11 | 320 kg C2 | 0.47 | 0.12% Glenium ACE30 | 6.4% Acc. 25 (0.35%) | 20° C. | 4 | 8.3 | 14.7 | 71.8 |
| 12 | 320 kg C2 | 0.47 | 0.125% Glenium ACE30 | 4.5% Acc. 27 (0.35%) | 20° C. | 9.2 | 18.5 | 24.2 | 72 |
| 13 | 320 kg C2 | 0.47 | 0.12% Glenium ACE30 | 0.35% ac Acc. 24 | 20° C. | 5.3 | 10.7 | 17.1 | 73.5 |
| 14 | 320 kg C2 | 0.47 | 0.12% Glenium ACE30 | 8% Acc. 24 (0.35%) + 0.1% THEED | 20° C. | 5.1 | 13 | 19.9 | 75.9 |
| 15 | 320 kg C3 | 0.47 | 0.14% Glenium ACE30 | | 20° C. | ~0 | 1.9 | 4.3 | 68.5 |
| 16 | 320 kg C3 | 0.47 | 0.115% Glenium ACE30 | 1% Ca(NO3)2 | 20° C. | 1.5 | 4 | 7.7 | 74 |
| 17 | 320 kg C3 | 0.47 | 0.11% Glenium ACE30 | 2% Ca(NO3)2 | 20° C. | 2.8 | 6.7 | 9.3 | 76 |
| 18 | 320 kg C3 | 0.47 | 0.115% Glenium ACE30 | 1% CaCl2 | 20° C. | 3.1 | 6.2 | 9.3 | 74.9 |
| 19 | 320 kg C3 | 0.47 | 0.115% Glenium ACE30 | 2% CaCl2 | 20° C. | 8.1 | 12.1 | 15.7 | 78.8 |
| 20 | 320 kg C3 | 0.47 | 0.125% Glenium ACE30 | 4.3% Acc. 26 (0.35%) | 20° C. | 4.2 | 10.8 | 17.3 | 68 |
| 21 | 320 kg C3 | 0.47 | 0.125% Glenium ACE30 | 4.3% Acc. 26 (0.35%) + 0.1% THEED | 20° C. | 4.4 | 13.3 | 20.1 | 76.3 |
| 22 | 320 kg C3 | 0.47 | 0.125% Glenium ACE30 | Acc. 26 + 0.05% THEED | 20° C. | 4.3 | 12.6 | 19.3 | 75.7 |
| 23 | 320 kg C3 | 0.47 | 0.13% Glenium ACE30 | 4.3% Acc. 1 (0.35%) | 20° C. | 2.6 | 6.5 | 12.3 | 65 |
| 24 | 320 kg C3 | 0.47 | 0.13% Glenium ACE30 | 0.05% THEED | 20° C. | n.P. | 1.6 | 3.7 | 68.6 |
| 25 | 320 kg C3 | 0.47 | 0.13%> Glenium ACE30 | 0.05% TIPA | 20° C. | n.p. | 1.7 | 4 | 71.4 |
| 26 | 320 kg C3 | 0.47 | 0.21% Glenium ACE30 | (0.35%) + 0.025% THEED | 20° C. | 2.4 | 5.1 | 11 | 67.9 |
| 27 | 320 kg C3 | 0.47 | 0.21% Glenium ACE30 | (0.35%) + 0.05% THEED | 20° C. | 2.2 | 5.3 | 12.3 | 70 |
| 28 | 320 kg C3 | 0.47 | 0.13% Glenium ACE30 | 4.3% Acc. 1 (0.35%) + 0.025% TIPA | 20° C. | 2.7 | 5.9 | 12.4 | 73.9 |
| 29 | 320 kg C3 | 0.47 | 0.13% Glenium ACE30 | 4.3% Acc. 1 (0.35%) + 0.05% TIPA | 20° C. | 2.7 | 6.9 | 15 | 73.2 |
| 30 | 320 kg C4 | 0.47 | 0.21% Glenium ACE30 | 4.3% Acc. 1 (0.35%) | 20° C. | 1.8 | 6.6 | 16.6 | 76.1 |
| 31 | 320 kg C4 | 0.47 | 0.21% Glenium ACE30 | 0.05% THEED | 20° C. | ~0 | ~0 | 2.6 | 78 |
| 32 | 320 kg C4 | 0.47 | 0.21% Glenium ACE30 | 0.05% TIPA | 20° C. | ~0 | ~0 | 2.9 | 78.6 |
| 33 | 320 kg C4 | 0.47 | 0.21% Glenium ACE30 | (0.35%) + 0.025% THEED | 20° C. | 1.9 | 6.8 | 16.8 | 78.3 |
| 34 | 320 kg C4 | 0.47 | 0.21% Glenium ACE30 | (0.35%) + 0.05% THEED | 20° C. | 2.1 | 7.1 | 18.7 | 78.5 |

TABLE 4-continued

Concrete test results

| N° Mix | CEM [kg] | W/C | Plasticizer | ACCELERATOR USED | Curing Temp. [°C.] | Compressive Strength (MPa) | | | |
|---|---|---|---|---|---|---|---|---|---|
| | | | | | | After 6 hours | After 8 hours | After 10 hours | After 28 days |
| 35 | 320 kg C4 | 0.47 | 0.21% Glenium ACE30 | 4.3% Acc. 1 (0.35%) + 0.025% TIPA | 20° C. | 1.8 | 6.8 | 18.8 | 80.7 |
| 36 | 320 kg C4 | 0.47 | 0.21% Glenium ACE30 | 4.3% Acc. 1 (0.35%) + 0.05% TIPA | 20° C. | 1.9 | 7.2 | 19 | 79.8 |

C1: Karlstadt CEM I 52.5 R 18 Apr. 2008
C2: Bernburg CEM I 42.5 R 07 Jul.2008
C3: Bernburg CEM I 42.5 R 17 Oct.2008
C4: Karlstadt CEM I 52.5 R 15 Oct.2008

The results of the concrete tests in Table 4 are discussed in the following chapter.

Concrete mixes No. 1 to 6 (with cement C1, W/C=0.47 and cured at 20° C.)

The mixes according to this invention 5 and 6 show a significant improvement of the early strength development at 6, 8 and 10 hours compared to the reference (mix 1) and the comparison examples 2 to 4 (even at a much lower content of active material in comparison with examples 2 to 4). This shows the surprising efficiency of the accelerators according to this invention when compared to state of the art accelerators.

The results in table 4 show that the improvement of the early age compressive strength (6, 8 and 10 hours) could be achieved also for different types of cement (C2, C3 and C4) at the temperature of 20° C. The accelerators according to this invention are therefore robust with respect to variations of the cement type. This is a feature highly appreciated in the concrete industry.

A number of samples according to this invention containing amines (e.g. TIPA and THEED) were also tested. The examples 14, 21, 22, 26-29 and 33-36 show a further improvement of the early strength, which is due to the surprising synergistic effects of amines (TIPA and THEED) with calcium silicate hydrate according to this invention in comparison to accelerators according to this invention without amines. The use of the amines only resulted only in relatively poor early compressive strength values (please compare with examples 24, 25, 31 and 32).

Concrete Tests—Precast Type with and without Steam Curing.

In precast plants, concrete forms are casted according to a cycle which is controlled by the time needed for reaching a certain compressive strength (values depend on the plant's requirements). In order to accelerate this cycle, precasters cure usually the concrete forms according to a certain temperature cycle at increased temperatures, especially during winter times when the hardening process is particularly low.

An acceleration of the hardening process can allow increasing the number of turnovers per day and therefore increasing a lot the productivity of the plant. On the other side, the use of an accelerator allows precasters to limit the use of high curing temperatures and therefore to make energy and cost savings.

Preparation

Two different concrete mix-designs relevant for the precast industry were used: a S5 type and a self-compacting concrete type (SCC).

According to DIN-EN 12390, the S5 concrete mix consists of:
400 kg of cement Monselice CEM I 52.5
970 kg of sand 0/4
900 kg of gravel (8/12)
2.8 kg of Glenium® ACE 30
190 litres of total water The water-to-cement ratio is constant and equal to 0.48.

According to DIN-EN 12390, the SCC concrete mix consists of:
400 kg of cement Monselice CEM I 52.5
910 kg of sand 0/4
800 kg of gravel (8/12)
150 kg of limestone filler
3.4 kg of Glenium® ACE 30
190 litres of total water The water-to-cement ratio is constant and equal to 0.48.

The indicated amounts of water include the water, which is contained in the added plasticizer and/or accelerator composition.

For both types of concrete mix-designs, two representative cures of a precast plant were tested. The first one is to simply store the concrete forms at 20° C. during the whole hardening. The second one (steam curing) follows a cycle of temperature, in which after the concrete casting the forms undergo a pre-conditioning at 20° C., then a heating during 2 hours from 20° C. to 60° C. (rate: 20° C./hour), then 1 hour at 60° C. and finally the forms are naturally cooled down at 20° C.

Results

TABLE 5

Concrete test results in S5 concretes:

| | Mix | | Compressive Strengths (MPa) | | | | | | | | |
|---|---|---|---|---|---|---|---|---|---|---|---|
| | | | 4 h | 6 h | 8 h | 14 h | 16 h | 18 h | 7 dd | 14 dd | 28 dd |
| Reference | 200 | at 20° C. | 2.3 | 13.2 | 22.7 | 34.8 | 36.1 | 41.6 | 54.1 | 56.4 | 60.8 |
| | 201 | with steam curing | 5.6 | 25.3 | 33.1 | 36.5 | 40.2 | 43.5 | 52.1 | 53 | 58.6 |

TABLE 5-continued

Concrete test results in S5 concretes:

| | Mix | | Compressive Strengths (MPa) | | | | | | | | |
|---|---|---|---|---|---|---|---|---|---|---|---|
| | | | 4 h | 6 h | 8 h | 14 h | 16 h | 18 h | 7 dd | 14 dd | 28 dd |
| 4.0% of Acc. 1 | 202 | at 20° C. | 7.8 | 23.2 | 29.2 | 38.9 | 39.9 | 41.3 | 54 | 56.9 | 57.7 |
| | 203 | with steam curing | 11 | 27.8 | 30.3 | 39.6 | 41.2 | 42.1 | 50.2 | 52.1 | 56.5 |

For both cures, the compressive strength achieved at the early age (here up to 7 days) are always higher when the inventive accelerator composition is used (mixes 202 & 203) compared to the reference mixes (200 & 201). It can be seen here that the very early strength (first 6 hours), which is the main property looked for by precasters, without steam curing (202) but with the addition of the accelerator composition 1 is comparable with the concrete mix with only steam curing (201). It means that the accelerator composition allows a high energy saving since precasters can cast without steam curing without any drawback on the very early strength. Besides the cost reductions due to the energy savings, the emissions of carbon dioxide can be reduced.

TABLE 6

Concrete test results in SCC concretes:

| | Mix | | Compressive Strengths (MPa) | | | | | | | | |
|---|---|---|---|---|---|---|---|---|---|---|---|
| | | | 4 h | 6 h | 8 h | 14 h | 16 h | 18 h | 7 dd | 14 dd | 28 dd |
| Reference | 204 | at 20° C. | 2.9 | 15.5 | 25.6 | 39.4 | 39.8 | 43.1 | 47.2 | 49.9 | 58 |
| | 205 | with steam curing | 8.5 | 27.5 | 33.2 | 42.1 | 43.6 | 44.5 | 46.2 | 48.7 | 55.2 |
| 4.0% of Acc. 1 | 206 | at 20° C. | 8.9 | 25 | 31.2 | 41.7 | 42.2 | 42.5 | 46.9 | 49.9 | 59.1 |
| | 207 | with steam curing | 17.5 | 30.2 | 33.5 | 43.6 | 44.5 | 45.2 | 47.1 | 52.8 | 55.4 |

The conclusions for the second type of concrete mixes (Self Compacting Concrete) are the same as previously explained for the S5 concrete type. The accelerator composition increases a lot the early strength with or without steam curing and can allow a decrease or even a complete elimination of the steam curing without any drawback on the strength of concrete forms at the early age. As the accelerator composition behaviour is very similar in both types of cure, it brings also robustness in the process and is very beneficial in a precast plant.

Mortar Tests—Compressive & Tensile Strength

It is known in the state of the art that mortar tests are qualitatively representative of the performance in concretes. Mortars tests are therefore used to compare efficiencies of the different accelerator compositions with the reference mortar mix (without any accelerator) and the usual accelerators known by the skilled person.

Preparation

The preparation of mortars follows the Norm EN 196-1.

The ingredients are the following:
225 g of total water
450 g of cement
1350 g of norm-sand The dosage of the accelerator compositions to be tested is expressed as weight percentage of suspension with respect to the cement weight and the corresponding percentages of active content are indicated in brackets (please see table 3).

Two different cements were used:
BB42.5R, which is a Bernburg CEM I 42.5R (17.10.2008) from the company Schwenk.
AA, which is an Aalborg White cement from the company Aalborg.

The mortar tests were done at a constant water to cement ratio (W/C) of 0.5. As usual the water contained in the accelerator is to be deducted from the batching water. The accelerator is mixed into the batching water.

An anhydrous sodium sulphate powder is used in some examples and it is dosed in weight percentage with respect to the cement weight and is dissolved in the batching water until complete dissolution.

As comparison examples (10, 11), fine silica ($SiO_2$) and calcium oxide (CaO) were mixed together. The silica is a very reactive and very fine precipitated silica Aerosil 200® from Degussa. The calcium oxide was freshly synthesised before the mortar mixing by decarbonation of an ultrapure calcium carbonate powder from the company VWR for 12 hours at 1.400° C. in an oven.

Also for comparison example, a nano-sized silica was also tested. This nano-sized silica is the product Cembinder C50® (noted C50) commercialized by the company Eka.

Steel forms are filled with the mortar mix and then were cured at 20° C. The compressive and flexural strengths are measured at 6, 10 and 24 hours.

The results of the mortar tests are represented in the tables 7 and 8.

The reference mortar mixes in tables 7 and 8, which do not contain any accelerator are the mixes 1 and b-1, 46, 49-51, 58-60, 67, 70-72, 79-81, 88-90 and 94-96. Mortar mixes containing state of the art accelerators, used here as comparison examples, are the mixes 2 to 12 and b-3. The mortar mixes using accelerator compositions according to this invention are in table 7 the mixes 13 to 39, b-2 and b4 and in table 8 all the samples with accelerator 24.

TABLE 7

Mortar test results

| | | | COMPRESSIVE STRENGTH [MPA] | | | FLEXURAL STRENGTH [MPA] | | |
|---|---|---|---|---|---|---|---|---|
| Mix ID | Cement | Accelerator | 6 hours | 10 hours | 24 hours | 6 hours | 10 hours | 24 hours |
| 1 | BB425.5 | | 0.6 | 3 | 18.1 | ~0 | 0.78 | 4.25 |
| 2 | BB42.5R | 0.5% Ca(NO3)2 | 1 | 3.5 | 16.9 | 0.22 | 0.97 | 4.13 |
| 3 | BB42.5R | 1% Ca(NO3)2 | 1 | 3.6 | 15.1 | 0.24 | 0.91 | 3.51 |
| 4 | BB42.5R | 2% Ca(NO3)2 | 1.2 | 3.3 | 13.3 | 0.36 | 0.89 | 3.18 |
| 5 | BB42.5R | 0.5% CaCl2 | 1.2 | 3.6 | 19.6 | 0.28 | 1.01 | 4.53 |
| 6 | BB42.5R | 1% CaCl2 | 1.9 | 4.3 | 18.9 | 0.46 | 1.39 | 4.17 |
| 7 | BB42.5R | 7.8% Acc. 19 (0.35%) | 1 | 3.5 | 17 | 0.28 | 0.95 | 4.04 |
| 8 | BB42.5R | 3.6% Acc. 20 (0.35%) | 0.9 | 3.9 | 18.3 | 0.2 | 1.07 | 4.14 |
| 9 | BB42.5R | 0.35% Acc. 21 | 0.9 | 2.9 | 18.4 | ~0 | 0.95 | 3.92 |
| 10 | BB42.5R | 1.5% SiO2 + 2.5% CaO | 1.7 | 5.8 | 21.3 | 0.44 | 1.46 | 4.8 |
| 11 | BB42.5R | 0.5% SiO2 + 0.83% CaO | 0.8 | 3.4 | 16 | ~0 | 1.07 | 4.01 |
| 12 | BB42.5R | 1% C50 | 0.9 | 2.7 | 18 | 0.24 | 0.92 | 4.44 |
| 13 | BB42.5R | 2.5% Acc. 1 (0.2%) | 1.2 | 4.8 | 17.4 | 0.35 | 1.26 | 4.24 |
| 14 | BB42.5R | 4.3% Acc. 1 (0.35%) | 1.7 | 6.2 | 18.3 | 0.57 | 1.75 | 4.12 |
| 15 | BB42.5R | 4.4% Acc. 2 (0.2%) | 1.4 | 5.1 | 19.6 | 0.43 | 1.46 | 4.39 |
| 16 | BB42.5R | 7.8% Acc. 2 (0.35%) | 2 | 6.6 | 19.8 | 0.67 | 1.84 | 4.48 |
| 17 | BB42.5R | 8% Acc. 4 (0.35%) | 1.9 | 6.2 | 19.5 | 0.57 | 1.66 | 4.44 |
| 18 | BB42.5R | 8% Acc. 5 (0.35%) | 2 | 6.5 | 19.1 | 0.61 | 1.77 | 4.21 |
| 19 | BB42.5R | 8.1% Acc. 6 (0.35%) | 1.8 | 6 | 16.8 | 0.54 | 1.69 | 4.14 |
| 20 | BB42.5R | 8% Acc. 7 (0.35%) | 1.8 | 5.8 | 17.9 | 0.51 | 1.75 | 3.94 |
| 21 | BB42.5R | 8% Acc. 8 (0.35%) | 2 | 6 | 17.8 | 0.6 | 1.65 | 4.06 |
| 22 | BB42.5R | 8.8% Acc. 9 (0.35%) | 2 | 6.4 | 17.3 | 0.59 | 1.61 | 3.82 |
| 23 | BB42.5R | 9.2% Acc. 10 (0.5%) | 1.5 | 4.9 | 17.3 | 0.43 | 1.3 | 4.03 |
| 24 | BB42.5R | 8.3% Acc. 11 (0.35%) | 2.1 | 6.2 | 18.1 | 0.62 | 1.72 | 3.8 |
| 25 | BB42.5R | 8.3% Acc. 12 (0.35%) | 2 | 6.8 | 18.1 | 0.63 | 1.85 | 4.01 |
| 26 | BB42.5R | 8.8% Acc. 13 (0.35%) | 2.1 | 6.6 | 18.6 | 0.62 | 1.98 | 3.94 |
| 27 | BB42.5R | 4.3% Acc. 16 (0.35%) | 1.6 | 6 | 18.7 | 0.54 | 1.66 | 4.22 |
| 28 | BB42.5R | 4.3% Acc. 17 (0.35%) | 1.8 | 6.1 | 19.3 | 0.56 | 1.6 | 4.15 |
| 29 | BB42.5R | 4.3% Acc. 18 (0.35%) | 1.7 | 5.6 | 17.7 | 0.51 | 1.65 | 4.36 |
| 30 | BB42.5R | 4.3% Acc. 26 (0.35%) | 2 | 6.4 | 20.6 | 0.6 | 1.69 | 4.78 |
| 31 | BB42.5R | 4.5% Acc. 27 (0.35%) | 2 | 6.2 | 20.2 | 0.57 | 1.67 | 4.52 |
| 32 | BB42.5R | 3.7% Acc. 28 (0.3%) | 1.8 | 9.5 | 22.8 | 0.54 | 2.47 | 4.46 |
| 33 | BB42.5R | 4.1% Acc. 29 (0.35%) | 1.2 | 5.9 | 18.1 | 0.48 | 1.72 | 4.14 |
| 34 | BB42.5R | 3.9% Acc. 30 (0.35%) | 1.3 | 5.5 | 18.8 | 0.36 | 1.58 | 4.48 |
| 35 | BB42.5R | 3.7% Acc. 31 (0.3%) | 2.1 | 9.8 | 23.2 | 0.55 | 2.49 | 4.51 |
| 36 | BB42.5R | 45.5% Acc. 32 (0.3%) | 2.5 | 7.7 | 16.3 | 0.71 | 2.098 | 3.69 |
| 37 | BB42.5R | 48.4% Acc. 33 (0.3%) | 1.9 | 7.4 | 14.6 | 0.676 | 2.121 | 3.71 |
| 38 | BB42.5R | 33.3% Acc. 34 (0.3%) | 2.2 | 10.2 | 21.1 | 0.493 | 2.51 | 4.24 |
| 39 | BB42.5R | 32.6% Acc. 35 (0.3%) | 3.2 | 11.1 | 23.1 | 0.81 | 2.95 | 4.95 |
| b-1 | AA | | 2.2 | 7.3 | 18.4 | 0.63 | 1.84 | 3.97 |
| b-2 | AA | 4.3% Acc. 1 (0.35%) | 3 | 10.9 | 27.7 | 0.89 | 2.74 | 4.55 |
| b-3 | AA | 1% Na2SO4 | 1.5 | 8.7 | 21.4 | 0.55 | 2.14 | 3.89 |
| b-4 | AA | 4.3% Acc. 1 (0.35%) + 1% Na2SO4 | 7.1 | 17.2 | 30 | 1.92 | 4.12 | 5.16 |

The results of the mortar tests in Table 7 are discussed in the following chapter.

Mortar Mixes No. 13 to 39 (with Cement Bernburg 42.5R)

The mixes according to this invention 13 to 39 show a significant improvement of the early strength development (compressive and flexural strength) at 6, 10 and 24 hours compared to the reference (mix 1) and the comparison examples 2 to 6 (prior art hardening accelerators). The mixes according to the invention (13 to 39) are also considerably more efficient than state-of-art calcium silicate hydrates accelerators (mix 7, 8 and 9). According to other comparison examples (mix 10, 11 and 12), only the mix 10 has achieved relatively comparable strength as the inventive accelerators but with 10 times more active solid content. Otherwise, mix 11 and 12 act much less efficiently than the inventive accelerator compositions. This confirms the accelerating effect seen previously on concrete mixes.

Mortar Mixes No. b-1 to b-4 (with Cement Aalborg White)

The mortar mix b-4 (mix of accelerator composition 1 and sodium sulphate) show the best strength development compared to the mix reference b-1 and also a strong synergetic effect when compared to the comparison example b-3 (only sodium sulphate) and the mix b-2 (only the accelerator composition 1).

Mortar Test Results with Supplementary Cementitious Materials (SCM)

Due to energy savings and cost reasons, cement and concrete producers replace more and more the cement by some supplementary cementitious materials. The drawback of this replacement is the very slow strength development of such concrete mixes and especially at the very early age (<1 day) of concrete or mortars. It is therefore particularly advantageous to accelerate the hardening of these mixes. The main supplementary cementitious materials which have a latently reactivity (which can contribute to the hardening) are the fly ashes and the blast furnace slags.

The preparation method and the mortar composition are the same as previously described for the mortar test with Portland cement, except for the partial substitution of Portland cement by the supplementary cementitious materials (noted SCMs). Details of the compositions and the degree of cement replacement by SCMs are summarized in table 8. The water to binder (W/B) ratio is 0.5. By binder is meant the quantity of cement plus the SCMI considered. Three different SCMs were tested, two blast furnace slags and one fly ash. The binders and acronyms used are the following:
C7: Karlstadt CEM I 42.5R 03.12.08
C8: Mergelstetten CEM I 42.5R 03.07.08
HSM 1: Slag Schwelgern HSM 4000
HSM 2: Slag Huckingen HSM 3000
F1: STEAG Flyash and 10 hours obtained when the accelerator composition 24 is added, is always better than the corresponding mix without the accelerator composition. In the same way, the strength development after 24 hours is either comparable or better. It has to be understood that only mortar mixes with the same cement factor can be compared together. For example only mortar mixes 49, 52 and 55 can be compared. In this case, the

TABLE 8

Mortar test results with supplementary cementitious materials

| | MIX DESIGN | | | COMPRESSIVE STRENGTH [MPA] | | | FLEXURAL STRENGTH [MPA] | | |
|---|---|---|---|---|---|---|---|---|---|
| MIX ID | CEMENT | SCM | Accelerator | 8 hours | 10 hours | 24 hours | 8 hours | 10 hours | 24 hours |
| 46 | 100% C8 | | | 0.5 | | 14.7 | 0.31 | | 3.63 |
| 47 | 100% C8 | | 13.6% Acc. 24 (0.6%) | 2.3 | | 16.3 | 0.69 | | 3.83 |
| 48 | 100% C8 | | 18.2% Acc. 24 (0.8%) | 2.7 | | 15.7 | 0.92 | | 3.64 |
| 49 | 80% C8 | 20% HSM1 | | ~0 | | 9.2 | ~0 | | 2.41 |
| 50 | 60% C8 | 40% HSM1 | | ~0 | | 6.2 | ~0 | | 1.82 |
| 51 | 30% C8 | 70% HSM1 | | ~0 | | 2.4 | ~0 | | 0.75 |
| 52 | 80% C8 | 20% HSM1 | 13.6% Acc. 24 (0.6%) | 1.7 | | 11.8 | 0.48 | | 3.09 |
| 53 | 60% C8 | 40% HSM1 | 13.6% Acc. 24 (0.6%) | 0.7 | | 7.4 | 0.35 | | 2.13 |
| 54 | 30% C8 | 70% HSM1 | 13.6% Acc. 24 (0.6%) | ~0 | | 3 | ~0 | | 0.93 |
| 55 | 80% C8 | 20% HSM1 | 18.2% Acc. 24 (0.8%) | 1.9 | | 11.2 | 0.61 | | 2.84 |
| 56 | 60% C8 | 40% HSM1 | 18.2% Acc. 24 (0.8%) | 1.3 | | 8.4 | 0.42 | | 2.25 |
| 57 | 30% C8 | 70% HSM1 | 18.2% Acc. 24 (0.8%) | ~0 | | 3.6 | 0.2 | | 1.06 |
| 58 | 80% C8 | 20% HSM2 | | ~0 | | 9 | ~0 | | 2.33 |
| 59 | 60% C8 | 40% HSM2 | | ~0 | | 5.8 | ~0 | | 1.51 |
| 60 | 30% C8 | 70% HSM2 | | ~0 | | 2.4 | ~0 | | 0.63 |
| 61 | 80% C8 | 20% HSM2 | 13.6% Acc. 24 (0.6%) | 1.6 | | 11.3 | 0.48 | | 2.81 |
| 62 | 60% C8 | 40% HSM2 | 13.6% Acc. 24 (0.6%) | 0.6 | | 6.8 | 0.32 | | 1.82 |
| 63 | 30% C8 | 70% HSM2 | 13.6% Acc. 24 (0.6%) | ~0 | | 2.4 | ~0 | | 0.75 |
| 64 | 80% C8 | 20% HSM2 | 18.2% Acc. 24 (0.8%) | 1.9 | | 11.3 | 0.58 | | 2.76 |
| 65 | 60% C8 | 40% HSM2 | 18.2% Acc. 24 (0.8%) | 1 | | 7.1 | 0.37 | | 1.96 |
| 66 | 30% C8 | 70% HSM2 | 18.2% Acc. 24 (0.8%) | ~0 | | 3.5 | ~0 | | 1.06 |
| 67 | 100% C7 | | | 0.7 | | 15.4 | 0.33 | | 3.48 |
| 68 | 100% C7 | | 13.6% Acc. 24 (0.6%) | 4.5 | | 18.2 | 1.37 | | 4.02 |
| 69 | 100% C7 | | 18.2% Acc. 24 (0.8%) | 5.6 | | 22.6 | 1.64 | | 4.76 |
| 70 | 80% C7 | 20% HSM1 | | ~0 | | 10 | ~0 | | 2.48 |
| 71 | 60% C7 | 40% HSM1 | | ~0 | | 5.8 | ~0 | | 1.62 |
| 72 | 30% C7 | 70% HSM1 | | ~0 | | 2.1 | ~0 | | 0.59 |
| 73 | 80% C7 | 20% HSM1 | 13.6% Acc. 24 (0.6%) | 2.8 | | 12 | 0.91 | | 3.15 |
| 74 | 60% C7 | 40% HSM1 | 13.6% Acc. 24 (0.6%) | 1.5 | | 7.8 | 0.5 | | 2.05 |
| 75 | 30% C7 | 70% HSM1 | 13.6% Acc. 24 (0.6%) | ~0 | | 2.4 | ~0 | | 0.7 |
| 76 | 80% C7 | 20% HSM1 | 18.2% Acc. 24 (0.8%) | 3.6 | | 14.7 | 1.11 | | 3.69 |
| 77 | 60% C7 | 40% HSM1 | 18.2% Acc. 24 (0.8%) | 1.9 | | 8.4 | 0.64 | | 2.3 |
| 78 | 30% C7 | 70% HSM1 | 18.2% Acc. 24 (0.8%) | ~0 | | 3.8 | 0.23 | | 1.21 |
| 79 | 80% C7 | 20% HSM2 | | ~0 | | 13.1 | ~0 | | 3.29 |
| 80 | 60% C7 | 40% HSM2 | | ~0 | | 7.6 | ~0 | | 2.03 |
| 81 | 30% C7 | 70% HSM2 | | ~0 | | 2.3 | ~0 | | 0.61 |
| 82 | 80% C7 | 20% HSM2 | 13.6% Acc. 24 (0.6%) | 2.2 | | 14.2 | 0.7 | | 3.43 |
| 83 | 60% C7 | 40% HSM2 | 13.6% Acc. 24 (0.6%) | 1.3 | | 7.6 | 0.4 | | 2.24 |
| 84 | 30% C7 | 70% HSM2 | 13.6% Acc. 24 (0.6%) | ~0 | | 2.6 | ~0 | | 0.88 |
| 85 | 80% C7 | 20% HSM2 | 18.2% Acc. 24 (0.8%) | 2.8 | | 14 | 2.8 | | 3.5 |
| 86 | 60% C7 | 40% HSM2 | 18.2% Acc. 24 (0.8%) | 1.5 | | 8.3 | 1.5 | | 2.39 |
| 87 | 30% C7 | 70% HSM2 | 18.2% Acc. 24 (0.8%) | ~0 | | 3.1 | ~0 | | 1.01 |
| 88 | 100% C8 | | | | 4.9 | 19.9 | | | |
| 89 | 80% C8 | 20% F1 | | | ~0 | 12.4 | | | |
| 90 | 50% C8 | 50% F1 | | | ~0 | 4.3 | | | |
| 91 | 100% C8 | | 6.82% Acc. 24 (0.3%) | | 9.6 | 20.8 | | | |
| 92 | 80% C8 | 20% F1 | 6.82% Acc. 24 (0.3%) | | 2.5 | 11.2 | | | |
| 93 | 50% C8 | 50% F1 | 6.82% Acc. 24 (0.3%) | | ~0 | 5.4 | | | |
| 94 | 100% C7 | | | | 6.8 | 19.9 | | | |
| 95 | 80% C7 | 20% F1 | | | 1.7 | 15.8 | | | |
| 96 | 50% C7 | 50% F1 | | | ~0 | 6.9 | | | |
| 97 | 100% C7 | | 6.82% Acc. 24 (0.3%) | | 13.2 | 22.4 | | | |
| 98 | 80% C7 | 20% F1 | 6.82% Acc. 24 (0.3%) | | 4.9 | 14.2 | | | |
| 99 | 50% C7 | 50% F1 | 6.82% Acc. 24 (0.3%) | | 2.7 | 6.6 | | | |

The results of the mortar tests in Table 8 are discussed in the following chapter.

Only one accelerator composition (Acc. 24) was tested here. For both cements tested here, for any degree of cement replacement (0%, 20%, 30%, 50%) and for all SCM tested here (the slags and fly ash), the strength development after 8 mortar mixes 55 and 52 (with inventive accelerator compositions) show faster strength development than the reference mortar mix 49.

Set Accelerators in Tile-Mortar Type Mixes

In such mixes, the mortar contains a certain quantity of high alumina cement (CAC). Generally, the extremely high reactivity of the alumina cement as soon as it is mixed with water prevents workers to handle such mortar mixes easily. To solve this problem, users add a low quantity of retarder to mixes for increasing the workability period. Retarders have also disadvantages like poor mechanical properties of mortars and are therefore combined with some accelerators. Typically, the accelerator in such mixes of the prior art is $Li_2CO_3$.

Preparation of Tile Mortars

The ingredients are the following:

800 g Cement 1200 g of norm-sand

Accelerators are dosed in percentage of solid with respect to the cement weight.

Retarders are dosed in percentage with respect to the cement weight.

The water to cement ratio is 0.46 or 0.5 and constant within the same series. The water added with the accelerator has to be deducted from the batching water. The accelerator and retarder are mixed in the batching water. Three different Portland cements were tested in combination with one high alumina cement. The setting-time was measured according to the standard DIN EN 196-3.

Results

Table 9 summarizes the results of the tile mortar tests. The reference mortar mixes (in table 9) which do not contain any accelerator are 100, 104 and 108. The mortar mixes (comparison examples) containing prior art accelerators are 101, 105, 109. Mortar mixes using the inventive accelerator compositions claimed in this patent are 102, 103, 106, 107, 110 and 111.

The same conclusions as previously can be drawn for a different cement. It can be concluded that the inventive accelerator composition is robust with respect to the cement type, which is a quality appreciated. In detail the inventive accelerator composition (mixes 109, 107) accelerates the setting time and the beginning of the setting compared to the reference (104) and compared to the formulation with the state-of-art hardening accelerator (105).

Mortar Mixes No. 108 to 111 (with Cement Portland Cement Dyckerhoff Weiβ, Retarded with Citric Acid, W/C=0.5)

Here, the setting times values are very close for all mixes. Nevertheless, it appears still advantageous to use the inventive hardening accelerator composition compared to state-of art accelerator regarding the cost of the $Li_2CO_3$.

The set accelerator effect given by the inventive accelerator composition is kept constant contrary to reference mixes and also contrary to mixes with $Li_2CO_3$. Indeed, the setting times values are here relatively not depending on the cement type or on the retarder chosen when we compared the mixes with the inventive accelerator composition (103, 107 and 111) which brings also a robustness advantage with respect to the whole formulation of the mortar.

Special Mortars

These are typically mortar mix designs where the formulation is complex due to the complexity of all properties which are required. Some components necessary for this formulation have usually drawbacks on the setting and on the strength development of these mortar mixes.

TABLE 9

Mortar test results in tile-mortar type mixes:

| Mix ID | Cement Mix | Retarder | Accelerator | W/C | Setting start [min] | Setting End [min] | Setting time [min] |
|---|---|---|---|---|---|---|---|
| 100 | 90% C 52.5R A + 10% CAC | 0.33% Tartric acid | | 0.46 | 88 | 99 | 11 |
| 101 | 90% C 52.5R A + 10% CAC | 0.33% Tartric acid | 0.14% Li2CO3 | 0.46 | 94 | 113 | 19 |
| 102 | 90% C 52.5R A + 10% CAC | 0.33% Tartric acid | 2.5% Acc. 1 (0.2%) | 0.46 | 49 | 57 | 8 |
| 103 | 90% C 52.5R A + 10% CAC | 0.33% Tartric acid | 4.3% Acc. 1 (0.35%) | 0.46 | 33 | 39 | 6 |
| 104 | 90% C 52.5R B + 10% CAC | 0.33% Tartric acid | | 0.46 | 52 | 61 | 9 |
| 105 | 90% C 52.5R B + 10% CAC | 0.33% Tartric acid | 0.14% Li2CO3 | 0.46 | 90 | 132 | 42 |
| 106 | 90% C 52.5R B + 10% CAC | 0.33% Tartric acid | 2.5% Acc. 1 (0.2%) | 0.46 | 50 | 55 | 5 |
| 107 | 90% C 52.5R B + 10% CAC | 0.33% Tartric acid | 4.3% Acc. 1 (0.35%) | 0.46 | 35 | 42 | 7 |
| 108 | 90% C 42.5R + 10% CAC | 0.38% Citric acid | | 0.5 | 49 | 55 | 6 |
| 109 | 90% C 42.5R + 10% CAC | 0.38% Citric acid | 0.155% Li2CO3 | 0.5 | 39 | 46 | 7 |
| 110 | 90% C 42.5R + 10% CAC | 0.38% Citric acid | 2.5% Acc. 1 (0.2%) | 0.5 | 32 | 39 | 7 |
| 111 | 90% C 42.5R + 10% CAC | 0.38% Citric acid | 4.3% Acc. 1 (0.35%) | 0.5 | 45 | 51 | 6 |

C52.5R A: HeidelbergCement Milke Dyckerhoff
C 52.5R B: Geseke
C42.5R: Dyckerhoff Weiβ
CAC: Kerneos Secar 51

Mortar Mixes No. 100 to 103 (with Portland Cement Milke, Retarded with Tartric Acid, W/C=0.46)

The mixes according to this invention 102 and 103 show a decrease of the setting time compared to the reference mixes (100) and also compared to the mortar mix accelerated with the state-of art hardening accelerator ($Li_2CO_3$) (Mortar mix 101). We note also that the occurrence of the setting starts occurs much earlier with the inventive accelerator composition Acc. 1. The inventive accelerator composition acts also as a setting accelerator. This is a big advantage in tile adhesive mortars because a fast setting allows that the tile sticks to the wall also in vertical applications (wall applications).

Mortar Mixes No. 104 to 107 (with Cement Portland Cement Geseke, Retarded with Tartric Acid, W/C=0.46)

Preparation No 1 (Light Weight Tile Adhesive).

The following dry-mortar is prepared (powder):

70% bw. CEM I 52.5R acc. EN 197,

20% b.w. foamed glass filler "Poraver" Poraver

4% b.w. lime stone powder "Omyacarb 5 GU", Omya

4% b.w. styrene acrylic copolymer "Acronal® 6029", BASF

1% b.w. Methyl-Hydroxyethyl-Cellulose, 10.000 cps "Walocel® MW 10.000 PF 40" Wolff 0.5% b.w. cellulose fibre "Arbocel® ZZC 500", Rettenmaier 0.5% b.w. bentonite clay "Optibent CP", Südchemie The powder is mixed with the proper quantity of water in order to reach a total water to powder ratio of 0.5 for all mixes and eventually an accelerator.

Results

In such a light weight tile adhesive preparation, without any accelerator (reference mix) the setting is observed 23 hours after the mixing with water and lasts 5 hours. By adding state-of-art set accelerator which is calcium formate by 2.85 weight % with respect to the cement weight, the setting begins 8 hours after the mixing and lasts 4.5 hours. By mixing with 12.3 weight % of the accelerator 5 (1% of active solid content), the setting begins only after 4 hours and last 4.5 hours. By mixing with 24.6 weight % of the accelerator 1 (2% of active content), the setting begins already after 3 hours and lasts 1.5 hours. The inventive hardening accelerator composition shows an improvement of the setting time compared to the reference and compared to a higher quantity of calcium formate (based on active solid content), in light weight tile adhesive-type mortar mixes.

Preparation No 2 (Light Repair Mortar)

The following dry-mortar is prepared and constituted the powder:
- 45% b.w. CEM I 42.5R acc. to EN 197
- 35% b.w. quartz sand 0.5-1 mm, Euroquarz
- 8% b.w. light weight filler "Fillite 500", Trelleborg
- 5% b.w. amorphous silica, Elkem
- 4% b.w. lime stone powder "Omyacarb 10 AL", Omya
- 2% b.w. styrene acrylic copolymer "Acronal 6095", BASF
- 0.5% b.w. melamine sulfonate "Melment F 10", BASF
- 0.5% b.w. bentonite clay "Bentone LT", Rockwood
- The powder is mixed with the proper quantity of water in order to reach a total water to powder ratio of 0.2 for all mixes and eventually an accelerator.

Results

In such a light repair mortar preparation, without any accelerator (reference mix) the compressive strengths are 3.4 MPa and 18.4 MPa, respectively 10 and 24 hours after the mixing with water. At same times, the flexural strengths are 0.9 and 3.9 MPa. The setting begins after 245 minutes and lasts 70 minutes. By adding 15.1 weight % of the accelerator composition 1 (1.22% of active solid content), the compressive strengths are 5.7 MPa and 20.1 MPa, respectively 10 and 24 hours after the mixing with water. At same times, the flexural strengths are 1.4 and 3.8 MPa. The setting begins after 220 minutes and lasts 70 minutes. It is clearly shown in light repair-type mortar mixes that the inventive accelerator composition can improve both the setting and the strength development.

Preparation No 3 (High Strength Concrete Repair Mortar).

The following dry-mortar is prepared:
- 35% b.w. CEM I 42.5R acc. to EN 197
- 55% b.w. quartz sand 0.1-1.4 mm, Sibelco
- 4% b.w. amorphous silica, Elkem
- 3% b.w. lime stone powder "Omyacarb 10 AL", Omya
- 1% b.w. styrene acrylic copolymer "Acronal® 6031", BASF
- 0.5% b.w. polycarboxylate "Melflux" BASF
- 0.5% b.w. clay "Pansil", Omya
- The powder is mixed with the proper quantity of water in order to reach a total water to powder ratio of 0.15 for all mixes and optionally an accelerator.

Results

In such a high strength concrete repair mortar preparation, without any accelerator (reference mix) the compressive strengths are 6 MPa and 35.2 MPa, respectively 12 hours and 3 days after the mixing with water. At same times, the flexural strengths are 1.6 and 4.4 MPa. The setting begins after 200 minutes and lasts 80 minutes. By adding 10.9 weight % of the accelerator composition 1 (0.88% of active solid content), the compressive strengths are 21.3 MPa and 45.5 MPa, respectively 12 hours and 3 days after the mixing with water. At same times, the flexural strengths are 4 and 4.9 MPa. The setting begins after 70 minutes and lasts 25 minutes. It is clearly shown in high strength concrete repair type mortar mixes that the inventive accelerator composition can improve both the setting and the strength development.

Mortar Tests "Delayed Strength Improvement" (for Ready-Mix Concrete)

Applications such as ready-mix concretes require a certain time of workability mainly depending on the time to transport the fresh concrete to the job-site. The use of the accelerator composition can be advantageously combined with some retarders in order to lengthen the period of workability and therefore to postpone the increasing of mechanical properties of concrete as it is desired. Usually, the workability is estimated by the measurement of the slump flow. For an acceptable workability the slump flow has to be kept in the range of about 22-18 centimetres for 1.5-2 hours after mixing water and cement.

Preparation

The ingredients are the following:
- 211.5 g of total water
- 450 g Cement
- 1.350 g of norm-sand.
- Accelerator dosed in percentage of dried solid with respect to the cement weight.
- A superplasticizer Glenium® SKY519 (obtainable from BASF Construction Chemicals GmbH) was used; the dosage is adapted for each mortar-mix in order to have a slump of around 20 cm. The dosage in Glenium® SKY519 is expressed in percentage of solution with respect to the cement weight.
- A retarder Delvo® Crete T (VZ) (obtainable from BASF Construction Polymers GmbH) was used in combination with the accelerator in order to keep the slump of around 20 cm during 2 hours. The dosage is expressed in percentage of solution with respect to the cement weight. Delvo® Crete T is a retarder containing as major components 1.3 weight % of citric acid and 4.7 weight % of $H_3PO_3$.

Two different cements were used here:
Bernburg CEM I 42.5R (17.10.2008), Schwenk
Le Havre 52.5N (11.06.2007), Lafarge The water to cement ratio is always constant, W/C=0.47. This means that the water added optionally with the accelerator composition, optionally with the retarder and with the superplasticizer has to be deducted from the batching water. The accelerator composition, the superplasticizers and eventually the retarder are mixed with the batching water. The accelerator composition is dosed as usual in weight % of solution with respect to the cement weight. Calcium nitrate tetrahydrate powder from the company VWR (purity 99.5%) (state-of-art accelerator) is dosed in percentage of calcium nitrate anhydrous solid with respect to the cement weight.

The slump flows were measured with a cone having a maximal diameter of 10 cm, a minimal diameter of 7 cm and a height of 6 cm, as it is described in the Norm EN 1015-3.

Results

The reference mortar mixes which do not contain any accelerator (reference mixes) are the mixes 114, 117 (Table 10). The concrete mixes containing state-of-art accelerators (calcium nitrate), used here as comparison examples, are the mixes 116, 119. The mortar mixes using the accelerator compositions claimed in this patent are the mixes 115, 118.

TABLE 10

Mortar mix compositions and mortar test results:

| Mix ID | 114 Reference | 115 With 4.3% Acc. 1 | 116 1% Ca(NO3)$_2$ | 117 Reference | 118 With 4.3% Acc. 1 | 119 1% Ca(NO3)$_2$ | |
|---|---|---|---|---|---|---|---|
| Norm-Sand | 1350 | 1350 | 1350 | 1350 | 1350 | 1350 | Mortar compositions [g] |
| Cement Bernburg CEM 1 42.5R | 450 | 450 | 450 | | | | |
| Cement Le Havre CEM I 52.5N | | | | 450 | 450 | 450 | |
| WATER | 208.13 | 191.16 | 206.76 | 209.48 | 193.62 | 208.45 | |
| Glenium SkY 519 (25% s.c.) | 4.50 | 3.06 | 3.60 | 2.70 | 0.54 | 1.35 | |
| Accelerator 5 | — | 21.28 | — | — | 21.28 | — | |
| DELVOCRETE (19% s.c.) | — | 1.66 | — | — | 0.95 | — | |
| Ca(NO3)$_2$*4H$_2$O (99% s.c.) | — | — | 6.54 | — | — | 6.54 | |
| slump at 0 min | 19.6 | 17.6 | 20.1 | 22.1 | 21.8 | 21.8 | SLUMPS [cm] |
| Slump at 30 min | 20.2 | 21.5 | 23.5 | 21.8 | 20.9 | 20.7 | |
| Slump at 60 min | 20.4 | 22.9 | 21.4 | 20.0 | 19.5 | 18.1 | |
| Slump at 120 min | 20.7 | 21.9 | 16.8 | 18.5 | 17.3 | 14.9 | |
| Flexural Strength 8 h | ~0 | 0.451 | 0.546 | ~0 | 1.506 | 0.951 | Mechanical Performances [MPa] |
| Flexural Strength 10 h | 0.315 | 0.969 | 0.986 | 0.704 | 2.375 | 1.708 | |
| Flexural Strength 16 h | 1.631 | 3.67 | 3.06 | 3.54 | 4.97 | 3.90 | |
| Flexural Strength 24 h | 1.717 | 4.95 | 5.49 | 5.21 | 4.96 | 5.09 | |
| Flexural Strength 48 h | 6.49 | 5.9 | 6.85 | 6.63 | 6.21 | 6.49 | |
| Compressive Strength 8 h | ~0 | 1.37 | 1.65 | ~0 | 5.00 | 3.17 | |
| Compressive Strength 10 h | 1.13 | 3.33 | 3.49 | 1.73 | 9.39 | 6.36 | |

Cement Bernburg, Mixes 114, 115 and 116:

For the three mixes, the slump values are maintained at an acceptable plateau during the 1.5 hours-2 hours as it is usually required. The flexural and compressive strengths are improved by the addition of the inventive accelerator composition 1 (mix 115) compared to the reference mix (114) and the state-of-art accelerated mix (116) especially after 16 hours. This result means that we can advantageously combine the inventive accelerator composition with a retarder in order to postpone the increase of the mechanical properties. It is also of a big advantageous importance that the use of the inventive accelerator composition does not hinder the workability properties of fresh concretes at the very early age (<2 hours) which is an absolute necessity in some ready-mix applications.

Cement Le Havre, Mixes 117, 118 and 119:

The conclusions are here the same as previously, the change of cement does not have an important influence on the behaviour of the inventive hardening accelerator, the mix 118 shows the best mechanical properties. The effect due to the accelerator composition is robust with respect to the cement. It is observed that the strength increase occurs after only 8 hours and is already highly better than the state-of-art accelerator performances (119).

Effect on cement hydration measured by heat flow calorimetry (samples M1 to M3 of table 3; the samples were obtained from a calcium compound and a silicon dioxide containing component)

The synthesis details of samples M1 to M3 (M2 and M3 are according to this invention, M1 is a comparison example without polymer) are summarized in table 3.

The influence of the hardening accelerators was tested on the cement Karlstadt 42.5 R by measurement of the heat release by heat flow calorimetry. The accelerator suspension was mixed with the batching water and the resulting suspension mixed with 20 g of the cement. The water to cement (w/c) ratio was set to 0.32. The dosage of the accelerators to be tested is expressed as weight percentage of solid content with respect to the cement weight. The heat flow curves are presented by FIG. 3. The addition of the hardening accelerator described in the invention accelerates the acceleration period (defined in H. F. W. Taylor (1997): Cement Chemistry, $2^{nd}$ edition, p. 212ff). The effect is summarized in Table 11.

FIG. 3: Heat flow curve of the hydration of Karlstadt cement

Heat flow curve 1 represents the blank (Karlstadt cement only), curves 2 to 4 show the results for Karlstadt cement with addition of 0.6 weight % of the respective accelerator (curve 2: Acc. M1 not according to this invention, curve 3: Acc. M2 and curve 4: Acc. M3).

TABLE 11

Time of minimal heat flow and $1^{st}$ heat flow maximum in the main period of hydration according to FIG. 3.

| Sample | Min [h] | 1. Max [h] | Δ [h] | Acceleration [%] |
|---|---|---|---|---|
| Karlstadt without Acc. | 1.7 | 9.4 | 7.7 | ±0 |
| +0.6 wt.-% Acc. M1 | 1.2 | 8.3 | 7.1 | −8 |
| +0.6 wt.-% Acc. M2 | 1.1 | 6.7 | 5.6 | −27 |
| +0.6 wt.-% Acc. M3 | 1.1 | 6.7 | 5.6 | −27 |

Mortar Test—Compressive and Tensile Strength

The compressive and tensile strength were measured on mortars prepared from the following ingredients according to EN 196-1:

225 g of total water
450 g of cement
1350 g of norm-sand

The accelerator according to the invention was mixed with the batching water before addition to the cement. Water from the accelerator suspension is included in the total water content.

The addition of the accelerator is given in active solid content (calcium silicate hydrate) in the acceleration suspension with respect to the cement content of the mortar.

Steel forms are filled with the mortar mix and then were cured at 20° C.

The measurements of compressive and flexural strength were performed after 6 h, 10 h and 24 hours.

TABLE 12

Mortar test results

| ID | Accelerator | Compressive Strength [N/mm$^2$] | | | Flexural Strength [N/mm$^2$] | | |
|---|---|---|---|---|---|---|---|
| | | 6 h | 10 h | 24 h | 6 h | 10 h | 24 h |
| 1 | — | ~0 | 3.0 | 18.1 | ~0 | 0.78 | 4.25 |
| 2 | +0.35 wt.-% Acc. M1 | 1.0 | 3.1 | 18.7 | 0.24 | 0.83 | 4.23 |
| 3 | +0.35 wt.-% Acc. M2 | 1.9 | 4.5 | 18.8 | 0.31 | 1.15 | 4.23 |
| 4 | +0.35 wt.-% Acc. M3 | ~0 | 4.0 | 19.5 | 0.20 | 1.17 | 4.51 |

The mortar test results show that a significant improvement of both compressive and flexural early strength could be obtained.

Measurement of the Water Penetration Depth

The measurement of the water penetration depth is a good insight of how a cementitious material can resist to damages from the environment, for example leaching, weathering or sulphate attack. Therefore, it shows how the material can be impermeable to the penetration of aggressive agents. A decrease of the water penetration depth is consequently information about the durability of the concrete. A long durability is a very important quality required by concrete producers and contractors.

Results

Mix 1 consists of:
5 kg of Bernburg CEM I 42.5R
12.21 kg of sand 0/4
3.55 kg of water.

Mix 2 consists of:
5 kg of Bernburg CEM I 42.5R
12.21 kg of sand 0/4
3.55 kg of water and
250 g of the accelerator composition Acc. 1. This represents 5 weight % of the suspension of Acc. 1 with respect to the cement weight. In both mixes, the water to cement must be constant. The water added with the accelerator has to be deducted from the batching water.

The water penetration depths are measured according to the DIN EN 12390-8 with the difference that the measurement was done after 14 days and not after more than 28 days. For the reference mix 1, a mean depth of 4.2 cm is obtained, whereas for the mix 2, containing the inventive accelerator composition, the mean depth is only 2.7 cm. The results show that surprisingly the use of the accelerator compositions according to this invention allows us reducing and improving significantly the water penetration of cementitious materials made with these accelerators. Another advantage of the accelerator composition according to this invention is its capability to better prevent concrete from being attacked by aggressive agents and to enhance consequently the durability of concrete.

The invention claimed is:

1. Composition containing calcium silicate hydrate and a polycondensate, the polycondensate containing
   (I) at least one structural unit consisting of an aromatic or heteroaromatic moiety bearing a polyether side chain and
   (II) at least one structural unit consisting of an aromatic or heteroaromatic moiety bearing at least one phosphoric acid ester group and/or its salt.

2. Composition according to claim 1, wherein the particle diameter of the calcium silicate hydrate is smaller than 1,000 nm, the particle size of the calcium silicate hydrate being measured by analytical ultracentrifugation.

3. Composition according to claim 1, in which the calcium silicate hydrate is foshagite, hillebrandite, xonotlite, nekoite, clinotobermorite, 9Å—tobermorite (riversiderite), 11Å—tobermorite, 14 Å—tobermorite (plombierite), jennite, metajennite, calcium chondrodite, afwillite, α—$C_2SH$, dellaite, jaffeite, rosenhahnite, killalaite and/or suolunite.

4. Composition according to claim 3, in which the calcium silicate hydrate is xonotlite, 9Å—tobermorite (riversiderite), 11Å—tobermorite, 14 Å—tobermorite (plombierite), jennite, metajennite, afwillite and/or jaffeite.

5. Composition according to claim 1, in which the molar ratio of Ca to Si in the calcium silicate hydrate is from 0.6 to 2.

6. Composition according to claim 1, in which the molar ratio of Ca to water in the calcium silicate hydrate is from 0.6 to 6.

7. Composition according to claim 1, wherein in the polycondensate the structural units (I) and (II) are represented by the following general formulae

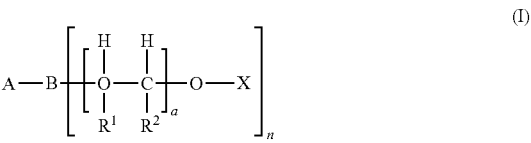

where

A are identical or different and are represented by a substituted or unsubstituted aromatic or heteroaromatic compound having 5 to 10 C atoms where B are identical or different and are represented by N, NH or O where n is 2 if B is N and n is 1 if B is NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where a are identical or different and are represented by an integer from 1 to 300 where
X are identical or different and are represented by a branched or straight-chain $C_1$- to $C_{10}$-alkyl radical, $C_5$- to $C_8$-cycloalkyl radical, aryl radical, heteroaryl radical or H

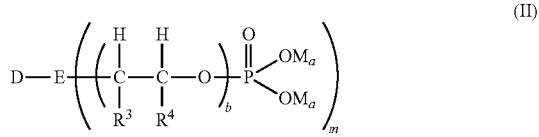

where
D are identical or different and are represented by a substituted or unsubstituted heteroaromatic compound having 5 to 10 C atoms
where
E are identical or different and are represented by N, NH or O
where
m is 2 if E is N and m is 1 if E is NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
b are identical or different and are represented by an integer from 1 to 300
where
M is independently of one another an alkaline metal ion, alkaline earth metal ion, ammonium ion, organic ammonium ion and/or H,
a is 1 or in the case of alkaline earth metal ions ½.

8. Composition according to claim 1, in which a water-soluble comb polymer plasticizer for hydraulic binders, optionally a comb polymer obtainable by radical polymerization of unsaturated monomers, is present in the aqueous solution of the polycondensate.

9. Composition according to claim 8, in which the water-soluble comb polymer plasticizer for hydraulic binders is present as a copolymer which contains, on the main chain, side chains having ether functions and acid functions.

10. Composition according to claim 8, in which the water-soluble comb polymer plasticizer for hydraulic binders is present as a copolymer which is produced by free radical polymerization in the presence of acid monomer, optionally carboxylic acid monomer, and polyether macromonomer, so that altogether at least 45 mol % of all structural units of the copolymer are produced by incorporation of acid monomer, optionally carboxylic acid monomer and polyether macromonomer in the form of polymerized units.

11. Composition according to claim 1, which is in powder form.

12. Composition according to claim 1, wherein the composition comprises an aqueous hardening accelerator suspension.

13. Composition according to claim 5, wherein the molar ration of Ca to Si in the calcium silicate hydrate is from 1 to 1.7.

14. Composition according to claim 6, wherein the molar ration of Ca to water in the calcium silicate hydrate is from 0.8 to 2.

15. Process of using a composition according to claim 1 in building material mixtures containing cement, gypsum, anhydrite, slag, ground granulated blast furnace slag, fly ash, silica dust, metakaolin, natural pozzolanas, calcined oil shale, calcium sulpho aluminate cement and/or calcium aluminate cement as binder, optionally in building material mixtures which contain substantially cement as a hydraulic binder, comprising adding water to the binder and the composition.

16. Building material mixtures containing a composition according to claim 1 and cement, gypsum, anhydrite, slag, ground granulated blast furnace slag, fly ash, silica dust, metakaolin, natural pozzolanas, calcined oil shale, calcium sulpho aluminate cement and/or calcium aluminate cement.

17. Process for the preparation of a hardening accelerator composition by reaction of a water-soluble calcium compound with a water-soluble silicate compound, the reaction of the water-soluble calcium compound with the water-soluble silicate compound being carried out in the presence of an aqueous solution of a polycondensate resulting in a composition containing calcium silicate hydrate and polycondensate, the polycondensate containing (I) at least one structural unit consisting of an aromatic or heteroaromatic moiety bearing a polyether side chain and (II) at least one structural unit consisting of an aromatic or heteroaromatic moiety bearing at least one phosphoric acid ester group and/or its salt.

18. Process according to claim 17, wherein the components are used in the following ratios:

i) 0.01 to 75% by weight of water-soluble calcium compound, ii) 0.01 to 75% by weight of water-soluble silicate compound, iii) 0.001 to 60% by weight of the polycondensate, iv) 24 to 99% by weight of water.

19. Process according to claim 17, wherein the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate, calcium aluminate, tricalcium silicate and/or dicalcium silicate.

20. Process according to claim 19, wherein the water-soluble calcium compound is present as calcium citrate, calcium tartrate, calcium formate and/or calcium sulphate.

21. Process according to claim 19, wherein the water-soluble calcium compound is present as calcium chloride and/or calcium nitrate.

22. Process according to claim 17, wherein the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

23. Process according to claim 22, wherein the water-soluble silicate compound is present as sodium metasilicate, potassium metasilicate and/or waterglass.

24. Process according to claim 17, wherein in the polycondensate the structural units (I) and (II) are represented by the following general formulae

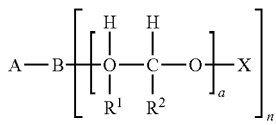

(I)

where

A are identical or different and are represented by a substituted or unsubstituted aromatic or heteroaromatic compound having 5 to 10 C atoms where B are identical or different and are represented by N, NH or O where n is 2 if B is N and n is 1 if B is NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where a are identical or different and are represented by an integer from 1 to 300 where

X are identical or different and are represented by a branched or straight-chain $C_1$- to $C_{10}$-alkyl radical, $C_5$- to $C_8$-cycloalkyl radical, aryl radical, heteroaryl radical or H

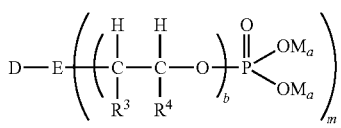

(II)

where

D are identical or different and are represented by a substituted or unsubstituted heteroaromatic compound having 5 to 10 C atoms where E are identical or different and are represented by N, NH or O where m is 2 if E is N and m is 1 if E is NH or O where $R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H where b are identical or different and are represented by an integer from 1 to 300 where

M is independently of one another an alkaline metal ion, alkaline earth metal ion, ammonium ion, organic ammonium ion and/or H, a is 1 or in the case of alkaline earth metal ions ½.

25. Process according to claim 17, wherein the molar ratio of the structural units (I):(II) is 1:10 to 10:1.

26. Process according to claim 17, wherein the polycondensate contains a further structural unit (III) which is represented by the following formula

(III)

where

Y, independently of one another, are identical or different and are represented by (I), (II), or further constituents of the polycondensate where $R^5$ are identical or different and are represented by H, $CH_3$, COOH or a substituted or unsubstituted aromatic or heteroaromatic compound having 5 to 10 C atoms where $R^6$ are identical or different and are represented by H, $CH_3$, COOH or a substituted or unsubstituted aromatic or heteroaromatic compound having 5 to 10 C atoms.

27. Process according to claim 26, wherein $R^5$ and $R^6$ in structural unit (III), independently of one another, are identical or different and are represented by H, COOH and/or methyl.

28. Process according to claim 26 wherein the molar ratio of the structural units [(I)+(II)]:(III) is 1:0.8 to 1:3 in the polycondensate.

29. Process according to claim 17 wherein the reaction is carried out in the presence of a water-soluble comb polymer plasticizer for hydraulic binders, optionally a comb polymer obtained by radical polymerization of unsaturated monomers.

30. Process according to claim 29, wherein the water-soluble comb polymer plasticizer for hydraulic binders is present as a copolymer which contains, on the main chain, side chains having ether functions and acid functions.

31. Process according to claim 29 wherein the water-soluble comb polymer plasticizer for hydraulic binders is present as a copolymer which is produced by free radical polymerization in the presence of acid monomer and polyether macromonomer, so that altogether at least 45 mol % of all structural units of the copolymer are produced by incorporation of acid monomer and polyether macromonomer in the form of polymerized units.

32. Process according to claim 17, wherein the reaction is carried out completely or partially in the presence of an aqueous solution containing a viscosity enhancer polymer, selected from polysaccharide derivatives and/or (co)polymers with a weight average molecular weight $M_w$ higher than 500,000 g/mol, the (co)polymers containing structural units derived, optionally by free radical polymerization, from nonionic (meth)acrylamide monomer derivatives and/or sulphonic acid monomer derivatives.

33. Process according to claim 17, followed by a process step in which the hardening accelerator composition is dried, optionally by a spray drying process.

34. Hardening accelerator composition obtained by the process according to claim 17.

35. Process according to claim 18, wherein 0.01 to 15% by weight of water-soluble calcium compound is used.

36. Process according to claim 18, wherein 0.01 to 10% by weight of water-soluble silicate compound is used.

37. Process according to claim 18, wherein 0.1 to 10% by weight of the polycondensate is used.

38. Process of using a hardening accelerator composition according to claim 34 in building material mixtures containing cement, gypsum, anhydrite, slag, ground granulated blast furnace slag, fly ash, silica dust, metakaolin, natural pozzolanas, calcined oil shale, calcium sulpho aluminate cement and/or calcium aluminate cement as binder, optionally in building material mixtures which contain substantially cement as a hydraulic binder, comprising adding water to the binder and the hardening accelerator composition.

39. Process for the preparation of a hardening accelerator composition by reaction of a calcium compound with a silicon dioxide containing component under alkaline conditions, wherein the reaction is carried out in the presence of an aqueous solution of a polycondensate resulting in a composition containing calcium silicate hydrate and a polycondensate, the polycondensate containing
(I) at least one structural unit consisting of an aromatic or heteroaromatic moiety bearing a polyether side chain and
(II) at least one structural unit consisting of an aromatic or heteroaromatic moiety bearing at least one phosphoric acid ester group and/or its salt.

40. Process for the preparation of a hardening accelerator according to claim 39, wherein the calcium compound is calcium hydroxide and/or calcium oxide.

41. Process for the preparation of a hardening accelerator according to claim 39, wherein the silicon dioxide containing compound is selected from microsilica, pyrogenic silica, precipitated silica, blast furnace slag, and/or quartz sand.

42. Process for the preparation of a hardening accelerator according to claim 39, wherein the pH-value is higher than 9.

43. Process according to claim 39, wherein the molar ratio of calcium from the calcium compound to silicon from the silicon dioxide containing component is from 0.6 to 2.

44. Process according to claim 39, wherein the weight ratio of water to the sum of calcium compound and silicon dioxide containing component is from 0.2 to 50.

45. Process according to claim 39, wherein in the polycondensate the structural units (I) and (II) are represented by the following general formulae

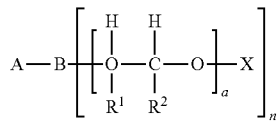
(I)

where
A are identical or different and are represented by a substituted or unsubstituted aromatic or heteroaromatic compound having 5 to 10 C atoms
where
B are identical or different and are represented by N, NH or O
where
n is 2 if B is N and n is 1 if B is NH or O
where
$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
a are identical or different and are represented by an integer from 1 to 300
where
X are identical or different and are represented by a branched or straight-chain $C_1$- to $C_{10}$-alkyl radical, $C_5$- to $C_8$-cycloalkyl radical, aryl radical, heteroaryl radical or H

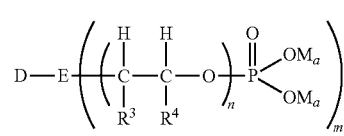
(II)

where
D are identical or different and are represented by a substituted or unsubstituted heteroaromatic compound having 5 to 10 C atoms
where
E are identical or different and are represented by N, NH or O
where
m is 2 if E is N and m is 1 if E is NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H
where
b are identical or different and are represented by an integer from 1 to 300
where
M is independently of one another an alkaline metal ion, alkaline earth metal ion, ammonium ion, organic ammonium ion and/or H,
a is 1 or in the case of alkaline earth metal ions ½.

46. Process according to claim 39, wherein the molar ratio of the structural units (I):(II) is 1:10 to 10:1.

47. Process according to claim 39, wherein the polycondensate contains a further structural unit (III) which is represented by the following formula

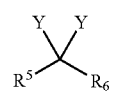
(III)

where
Y, independently of one another, are identical or different and are represented by (I), (II), or further constituents of the polycondensate
where
$R^5$ are identical or different and are represented by H, $CH_3$, COOH or a substituted or unsubstituted aromatic or heteroaromatic compound having 5 to 10 C atoms
where
$R^6$ are identical or different and are represented by H, $CH_3$, COOH or a substituted or unsubstituted aromatic or heteroaromatic compound having 5 to 10 C atoms.

48. Process according to claim 47, wherein $R^5$ and $R^6$ in structural unit (III), independently of one another, are identical or different and are represented by H, COOH and/or methyl.

49. Process according to claim 47 wherein the molar ratio of the structural units [(I)+(II)]:(III) is 1:0.8 to 1:3 in the polycondensate.

50. Process according to claim 39 wherein the reaction is carried out in the presence of a water-soluble comb polymer plasticizer for hydraulic binders, optionally a comb polymer obtained by radical polymerization of unsaturated monomers.

51. Process according to claim 50, wherein the water-soluble comb polymer plasticizer for hydraulic binders is present as a copolymer which contains, on the main chain, side chains having ether functions and acid functions.

52. Process according to claim 50 wherein the water-soluble comb polymer plasticizer for hydraulic binders is present as a copolymer which is produced by free radical polymerization in the presence of acid monomer and polyether macromonomer, so that altogether at least 45 mol % of all structural units of the copolymer are produced by incorporation of acid monomer and polyether macromonomer in the form of polymerized units.

53. Process according to claim 39, wherein the reaction is carried out completely or partially in the presence of an aqueous solution containing a viscosity enhancer polymer, selected from polysaccharide derivatives and/or (co)polymers with a weight average molecular weight $M_w$ higher than 500,000 g/mol, the (co)polymers containing structural units derived, optionally by free radical polymerization, from nonionic (meth)acrylamide monomer derivatives and/or sulphonic acid monomer derivatives.

54. Process according to claim 39, followed by a process step in which the hardening accelerator composition is dried, optionally by a spray drying process.

55. Hardening accelerator composition obtained by the process according to claim 39.

56. Process of using a hardening accelerator composition according to claim 55 in building material mixtures containing cement, gypsum, anhydrite, slag, ground granulated blast furnace slag, fly ash, silica dust, metakaolin, natural pozzolanas, calcined oil shale, calcium sulpho aluminate cement and/or calcium aluminate cement as binder, optionally in building material mixtures which contain substantially cement as a hydraulic binder, comprising adding water to the binder and the hardening accelerator composition.

57. Process according to claim 43, wherein the molar ration of calcium from the calcium compound to silicon from the silicon dioxide containing component is from 1.1 to 1.8.

58. Building material mixtures containing a hardening accelerator composition according to claim 34 and cement, gypsum, anhydrite, slag, ground granulated blast furnace slag, fly ash, silica dust, metakaolin, natural pozzolanas, calcined oil shale, calcium sulpho aluminate cement and/or calcium aluminate cement.

59. Building material mixtures containing a hardening accelerator composition according to claim 55 and cement, gypsum, anhydrite, slag, ground granulated blast furnace slag, fly ash, silica dust, metakaolin, natural pozzolanas, calcined oil shale, calcium sulpho aluminate cement and/or calcium aluminate cement.

* * * * *

UNITED STATES PATENT AND TRADEMARK OFFICE
CERTIFICATE OF CORRECTION

Page 1 of 1

PATENT NO. : 9,045,377 B2
APPLICATION NO. : 13/392988
DATED : June 2, 2015
INVENTOR(S) : Nicoleau et al.

It is certified that error appears in the above-identified patent and that said Letters Patent is hereby corrected as shown below:

In the Claims

In claim 7 (column 52, lines 43-48), the chemical structure represented by general formulae (I) is incorrect. General formulae (I) should read:

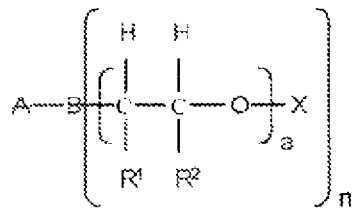

In claim 24 (column 55, lines 1-6), the chemical structure represented by general formulae (I) is incorrect. General formulae (I) should read:

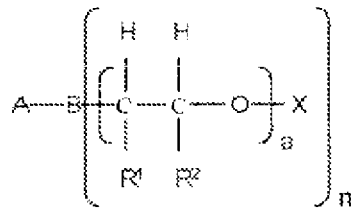

In claim 45 (column 57, lines 39-44), the chemical structure represented by general formulae (I) is incorrect. General formulae (I) should read:

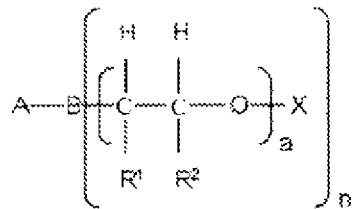

Signed and Sealed this
Seventeenth Day of November, 2015

Michelle K. Lee
*Director of the United States Patent and Trademark Office*